(12) United States Patent
Shahidzadeh et al.

(10) Patent No.: US 11,455,641 B1
(45) Date of Patent: Sep. 27, 2022

(54) SYSTEM AND METHOD TO IDENTIFY USER AND DEVICE BEHAVIOR ABNORMALITIES TO CONTINUOUSLY MEASURE TRANSACTION RISK

(71) Applicant: Acceptto Corporation, Portland, OR (US)

(72) Inventors: Nahal Shahidzadeh, Portland, OR (US); Shahrokh Shahidzadeh, Portland, OR (US); Haitham Akkary, Portland, OR (US)

(73) Assignee: SecureAuth Corporation, Irvine, CA (US)

( * ) Notice: Subject to any disclaimer, the term of this patent is extended or adjusted under 35 U.S.C. 154(b) by 0 days.

(21) Appl. No.: 17/140,017

(22) Filed: Jan. 1, 2021

Related U.S. Application Data

(63) Continuation-in-part of application No. 16/298,990, filed on Mar. 11, 2019, now Pat. No. 11,005,839.
(Continued)

(51) Int. Cl.
*G06Q 20/40* (2012.01)
*G06Q 20/42* (2012.01)
(Continued)

(52) U.S. Cl.
CPC ....... *G06Q 20/4016* (2013.01); *G06Q 20/425* (2013.01); *H04L 63/0869* (2013.01);
(Continued)

(58) Field of Classification Search
CPC ............. G06Q 20/4016; G06Q 40/025; H04L 63/0861; H04L 67/306; H04L 63/18; H04L 67/22; H04L 63/0869; H04L 63/0892
See application file for complete search history.

(56) References Cited

U.S. PATENT DOCUMENTS

| 5,903,882 A | 5/1999 | Asay |
| 6,636,721 B2 | 10/2003 | Threadgill |

(Continued)

OTHER PUBLICATIONS

Search Report from IP.com (dated Jun. 2, 2021) (Year: 2021).*
(Continued)

*Primary Examiner* — Sharon S Lynch
(74) *Attorney, Agent, or Firm* — Roark IP

(57) ABSTRACT

Aspects of the disclosure provide techniques for using behavior based information for providing and restricting access to a secure website, or computer network and its assets to a user. Components of the system may include the following. Client remote computing device, network and browser unique attribute data collection and fingerprinting. Method for capturing user habits and fingerprinting with ability to detect abnormalities through AIML using mobile and wearable device applications. System for detection of normality of user behavior based on habits, and cyber transactions, device access and determining a confidence score associated with each transaction. Method for calculating individual transaction risk based on contextual factors such as user behavior, device, browser and the network traffic and request for authentication by account owner when risk greater than allowed threshold. Method and system to identify user device, browser, and behavior unique attributes, storing and later matching to infer change upon consequent transactions and measuring transaction risk through a search and match against classified set of static and dynamic attributes using a user, browser traffic, device search and match engine.

18 Claims, 12 Drawing Sheets

Related U.S. Application Data

(60) Provisional application No. 62/641,362, filed on Mar. 11, 2018.

(51) Int. Cl.
  *H04L 9/40* (2022.01)
  *H04L 67/306* (2022.01)
  *H04L 67/50* (2022.01)

(52) U.S. Cl.
  CPC .......... *H04L 63/0892* (2013.01); *H04L 63/18* (2013.01); *H04L 67/306* (2013.01); *H04L 67/535* (2022.05); *H04L 63/0861* (2013.01)

(56) References Cited

U.S. PATENT DOCUMENTS

| | | |
|---|---|---|
| 6,850,497 B1 | 2/2005 | Sigler |
| 7,243,369 B2 | 7/2007 | Bhat |
| 7,260,734 B2 | 8/2007 | Dickinson |
| 7,395,435 B2 | 7/2008 | Benhammou |
| 7,584,152 B2 | 9/2009 | Gupta |
| 7,721,322 B2 | 5/2010 | Sastry |
| 7,962,419 B2 | 6/2011 | Gupta |
| 7,971,062 B1 | 6/2011 | Hughes et al. |
| 8,127,142 B2 | 2/2012 | Cuppett |
| 8,127,982 B1 | 3/2012 | Casey |
| 8,205,249 B2 | 6/2012 | Meister et al. |
| 8,244,629 B2* | 8/2012 | Lewis ................ G06Q 20/4016 705/38 |
| 8,261,089 B2 | 9/2012 | Cobos et al. |
| 8,346,924 B1 | 1/2013 | Bucher et al. |
| 8,423,476 B2 | 4/2013 | Bishop |
| 8,457,781 B2 | 6/2013 | Bailey |
| 8,510,797 B2 | 8/2013 | Kasturi |
| 8,510,811 B2 | 8/2013 | Kuang et al. |
| 8,516,542 B2 | 8/2013 | Lerner |
| 8,572,714 B2 | 10/2013 | Radhakrishnan |
| 8,612,357 B2 | 12/2013 | Phillips |
| 8,615,562 B1 | 12/2013 | Huang |
| 8,756,861 B2 | 6/2014 | Lavenberg |
| 8,776,204 B2 | 7/2014 | Faynberg et al. |
| 8,831,677 B2 | 9/2014 | Villa-Real |
| 8,904,494 B2 | 12/2014 | Kindler |
| 9,077,758 B1 | 7/2015 | McGovern |
| 9,288,217 B2* | 3/2016 | Kirkham ................ G06F 21/31 |
| 9,374,369 B2 | 6/2016 | Mahaffey |
| 9,419,951 B1 | 8/2016 | Felsher |
| 9,426,183 B2 | 8/2016 | Shahidzadeh |
| 9,444,824 B1 | 9/2016 | Balazs |
| 9,510,320 B2 | 11/2016 | Reed |
| 9,516,053 B1* | 12/2016 | Muddu ............... H04L 63/1433 |
| 9,613,257 B2 | 4/2017 | Phillips |
| 9,674,205 B2* | 6/2017 | Kirkham ................ G06F 21/31 |
| 10,193,897 B2* | 1/2019 | Kirkham ............... H04L 63/126 |
| 10,270,748 B2* | 4/2019 | Briceno .................. G06F 21/31 |
| 10,325,259 B1 | 6/2019 | Shahidzadeh |
| 10,366,378 B1* | 7/2019 | Han ..................... G06Q 20/202 |
| 10,367,826 B2* | 7/2019 | Kirkham ................ G06F 21/31 |
| 10,387,980 B1 | 8/2019 | Shahidzadeh |
| 10,498,605 B2* | 12/2019 | Weith .................. H04L 41/0893 |
| 10,567,402 B1* | 2/2020 | Comeaux ............. G06F 16/951 |
| 10,572,884 B1* | 2/2020 | Comeaux ............. G06N 20/00 |
| 10,637,853 B2* | 4/2020 | Lindemann ........... H04L 63/126 |
| 10,805,315 B2* | 10/2020 | Kirkham ............... H04L 63/126 |
| 10,812,503 B1* | 10/2020 | Comeaux .............. H04L 63/1433 |
| 10,834,104 B1* | 11/2020 | Comeaux ............. G06F 21/554 |
| 10,904,263 B2* | 1/2021 | Zu ............................ H04L 63/12 |
| 10,943,230 B2* | 3/2021 | Chamberot ............. G06F 21/34 |
| 10,949,858 B2* | 3/2021 | White ................... G07F 7/1083 |
| 10,992,692 B1* | 4/2021 | Comeaux ............. H04L 63/1416 |
| 11,005,862 B1* | 5/2021 | Comeaux ............. G06N 3/0445 |
| 11,037,160 B1* | 6/2021 | Koi ..................... G06Q 20/4016 |
| 11,334,932 B2* | 5/2022 | Sarin ................... G06Q 30/0609 |
| 2003/0061111 A1 | 3/2003 | Dutta |
| 2003/0115142 A1 | 6/2003 | Brickell et al. |
| 2004/0155101 A1 | 8/2004 | Royer et al. |
| 2005/0060584 A1 | 3/2005 | Ginter |
| 2005/0097320 A1* | 5/2005 | Golan .................... G06F 21/40 713/166 |
| 2005/0102530 A1 | 5/2005 | Burrows |
| 2006/0282660 A1* | 12/2006 | Varghese ........... G06Q 20/4016 713/155 |
| 2007/0011066 A1 | 1/2007 | Steeves |
| 2007/0033136 A1 | 2/2007 | Hu |
| 2007/0118891 A1 | 5/2007 | Buer |
| 2007/0156611 A1 | 7/2007 | Gupta |
| 2007/0262136 A1 | 11/2007 | Ou |
| 2008/0101283 A1 | 5/2008 | Calhoun |
| 2008/0196088 A1 | 8/2008 | Vinokurov |
| 2008/0222283 A1 | 9/2008 | Ertugrul |
| 2009/0077163 A1 | 3/2009 | Ertugrul |
| 2009/0089869 A1* | 4/2009 | Varghese ........... G06Q 20/4014 726/7 |
| 2009/0097661 A1 | 4/2009 | Orsini |
| 2009/0132808 A1 | 5/2009 | Baentsch et al. |
| 2009/0259838 A1 | 10/2009 | Lin |
| 2009/0271847 A1 | 10/2009 | Karjala |
| 2009/0292927 A1 | 11/2009 | Wenzel |
| 2009/0307135 A1 | 12/2009 | Gupta |
| 2010/0228996 A1 | 9/2010 | Ginter et al. |
| 2010/0327056 A1* | 12/2010 | Yoshikawa ........ G06Q 20/4016 235/380 |
| 2011/0035788 A1 | 2/2011 | White et al. |
| 2011/0047044 A1* | 2/2011 | Wright ............... G06Q 20/4016 705/26.35 |
| 2011/0086612 A1 | 4/2011 | Montz et al. |
| 2011/0093927 A1 | 4/2011 | Leppanen |
| 2011/0173017 A1 | 7/2011 | Salonen |
| 2011/0173448 A1 | 7/2011 | Baentsch et al. |
| 2011/0204142 A1 | 8/2011 | Rao |
| 2011/0209200 A2 | 8/2011 | White |
| 2011/0276468 A1* | 11/2011 | Lewis ..................... G06Q 20/40 705/38 |
| 2011/0288996 A1 | 11/2011 | Kreutz et al. |
| 2011/0296513 A1 | 12/2011 | Kasad |
| 2011/0307949 A1 | 12/2011 | Ronda et al. |
| 2012/0117157 A1 | 5/2012 | Ristock |
| 2012/0192260 A1 | 7/2012 | Kontsevich |
| 2012/0330788 A1 | 12/2012 | Hanson |
| 2013/0007849 A1 | 1/2013 | Coulter |
| 2013/0047202 A1 | 2/2013 | Radhakrishnan |
| 2013/0047213 A1 | 2/2013 | Radhakrishnan et al. |
| 2013/0111549 A1 | 5/2013 | Sowatskey |
| 2013/0144888 A1* | 6/2013 | Faith ..................... G06F 16/338 707/748 |
| 2013/0185205 A1 | 7/2013 | Boss et al. |
| 2013/0205133 A1 | 8/2013 | Hess |
| 2013/0276125 A1* | 10/2013 | Bailey .................. H04L 63/083 726/25 |
| 2013/0298242 A1 | 11/2013 | Kumar et al. |
| 2013/0305322 A1 | 11/2013 | Raleigh |
| 2014/0040975 A1 | 2/2014 | Raleigh |
| 2014/0164218 A1* | 6/2014 | Stewart ................. G06Q 50/01 705/38 |
| 2014/0189808 A1 | 7/2014 | Gupta |
| 2014/0189809 A1 | 7/2014 | Koved et al. |
| 2014/0189840 A1 | 7/2014 | Metke et al. |
| 2014/0289833 A1* | 9/2014 | Briceno ................ H04L 63/205 726/5 |
| 2014/0304795 A1 | 10/2014 | Bruno et al. |
| 2015/0156208 A1* | 6/2015 | Kirkham ................ G06F 21/31 726/4 |
| 2016/0164885 A1* | 6/2016 | Kirkham ............... H04L 63/126 726/3 |
| 2017/0244728 A1* | 8/2017 | Kirkham ................ G06F 21/31 |
| 2018/0041503 A1* | 2/2018 | Lindemann ........... H04L 63/0435 |
| 2018/0101676 A1* | 4/2018 | Bailey ................... G06F 21/46 |
| 2018/0189782 A1* | 7/2018 | Chamberot .......... G06Q 20/341 |
| 2018/0276572 A1 | 9/2018 | Otillar |
| 2018/0316661 A1* | 11/2018 | Teixeron ............... H04L 9/0863 |
| 2019/0073676 A1* | 3/2019 | Wang .................... G06Q 50/01 |
| 2019/0108334 A1* | 4/2019 | Sadaghiani ........... G06N 5/045 |
| 2019/0132333 A1* | 5/2019 | Kirkham ................ G06F 21/31 |

(56) References Cited

U.S. PATENT DOCUMENTS

| | | | | |
|---|---|---|---|---|
| 2019/0188723 | A1* | 6/2019 | Wang | G06Q 20/3224 |
| 2019/0253404 | A1* | 8/2019 | Briceno | H04W 12/06 |
| 2019/0281036 | A1* | 9/2019 | Eisen | G06F 21/31 |
| 2019/0297091 | A1* | 9/2019 | Kirkham | G06F 21/316 |
| 2020/0021603 | A1* | 1/2020 | Zu | H04L 63/12 |
| 2020/0043118 | A1 | 2/2020 | Sakaguchi | |
| 2020/0175434 | A1 | 6/2020 | Wisniewski | |
| 2020/0184480 | A1* | 6/2020 | Wang | G06Q 50/01 |
| 2020/0242222 | A1 | 7/2020 | Machani et al. | |
| 2021/0168156 | A1* | 6/2021 | Zu | H04L 67/02 |

OTHER PUBLICATIONS

Search Query Report from IP.com (dated Oct. 30, 2021) (Year: 2021).*
Search Query Report from IP.com (dated Apr. 22, 2022) (Year: 2022).*
Search Query Report from IP.com (dated May 18, 2022) (Year: 2022).*
Khanna, Tarun, "Contextual Intelligence", Harvard Business Review, Sep. 2014.
Smart, M. B. Improving remote identity authentication for consumers and financial institutions. Proquest, LLC (2016).

* cited by examiner

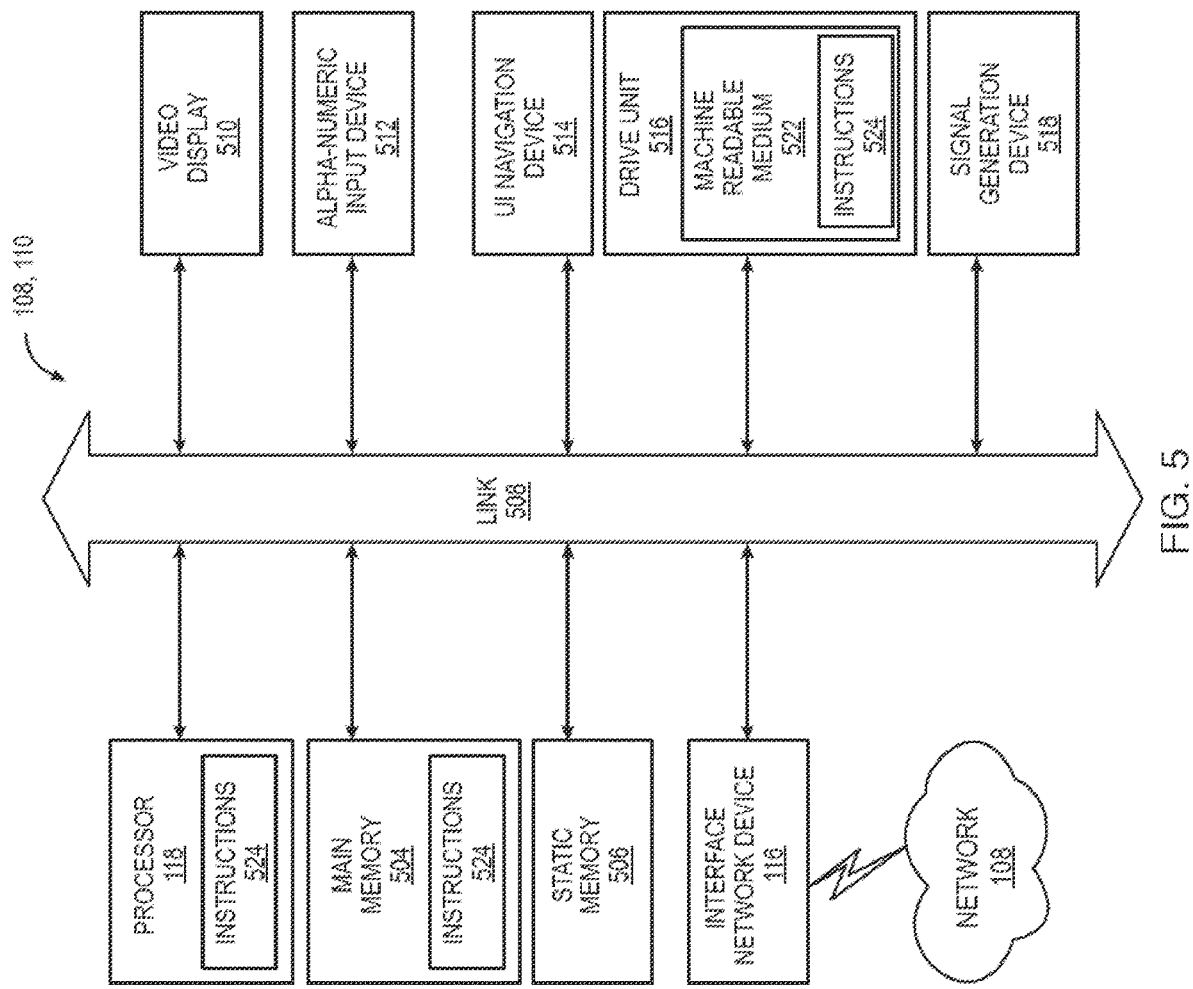

SYSTEM AND METHOD TO IDENTIFY USER AND DEVICE BEHAVIOR ABNORMALITIES TO CONTINUOUSLY MEASURE TRANSACTION RISK

CROSS REFERENCE TO RELATED APPLICATIONS

This application is a Continuation-In-Part of U.S. patent application Ser. No. 16/298,990, filed on Mar. 11, 2019; which claims priority to U.S. Patent Provisional Application No. 62/641,362, filed Mar. 11, 2018; both of which are hereby incorporated by reference in their entirety.

TECHNICAL FIELD

The subject matter disclosed herein generally relates to entity authentication and identifying abnormalities to measure transaction risk for use on a user device.

BACKGROUND

Digital transactions of a variety of types may stem not from a party authorized to enter in to the transaction but by parties that are either unauthorized to enter in to the transaction or bad actors and network bots who have acquired the means to enter in to the transaction illegally from a hostile environment. The hostile environment that may have resulted from a Denial of Service (DoS) attack from sources such as User Datagram Protocol (UDP) flooding, Internet Control Message Protocol (ICMP) flooding, and/or Portscan. For instance, a stolen credit card number or bank account access may be utilized to make fraudulent purchases or transactions-exchanges. A stolen or compromised password may be utilized to improperly access information. Even conventional purchases or activities within an organization may be engaged in by an employee or member who does not have authorization to do so. In these cases, certain purchases or transactions may be initiated by one party, such as a regular employee, but require authorization by a second party, such as a manager.

SUMMARY OF THE INVENTION

Aspects of the disclosure include a system for using user entity behavior based information for providing and restricting access to a secure computer network comprising: a processor coupled to a network interface, the processor configured to: capture contextual factors of a user entity interacting with a mobile device, wherein the contextual factors include user entity behavior, characteristics of device, characteristics of browser and network traffic; receive a transaction request from the mobile device; calculate a transaction risk and confidence score for the transaction request based on the contextual factors; and compare the transaction risk and confidence score to a predetermined threshold risk score to determine whether the transaction request is approved. In some embodiments, a context aware risk based approach is used. Aspects of the disclosure further include a system for using user entity context and behavior information for providing and restricting access to a secure computer network comprising: a plurality of processors coupled to a network interface, the processors configured to: capture behavioral and contextual factors of a user entity interacting with a client device used to access cloud services, wherein the behavioral and contextual factors include the user entity behavior and habits, client device characteristics, client device browser characteristics and network traffic; calculate a transaction risk and confidence score of a user entity, the client device and the client device browser for a transaction request based on the user entity behavior and habits and client device characteristics; and compare the transaction risk and confidence score to a predetermined threshold required risk score to determine whether the transaction request is automatically approved and if not approved, send an out of band authentication request to the user entity device to authenticate and authorize access.

BRIEF DESCRIPTION OF THE DRAWINGS

Some embodiments are illustrated by way of example and not limitation in the figures of the accompanying drawings.

FIG. 4A illustrates a schematic view of the details of the Risk & Analytics Engine 108 (e.g., eGuardian® device) with a Core Artificial Intelligence and Machine Learning (AIML) Risk Engine 108a.

FIG. 5 is a block diagram illustrating components of Risk & Analytics Engine 108 and Relying Party Server 110.

DETAILED DESCRIPTION

Figure 1:
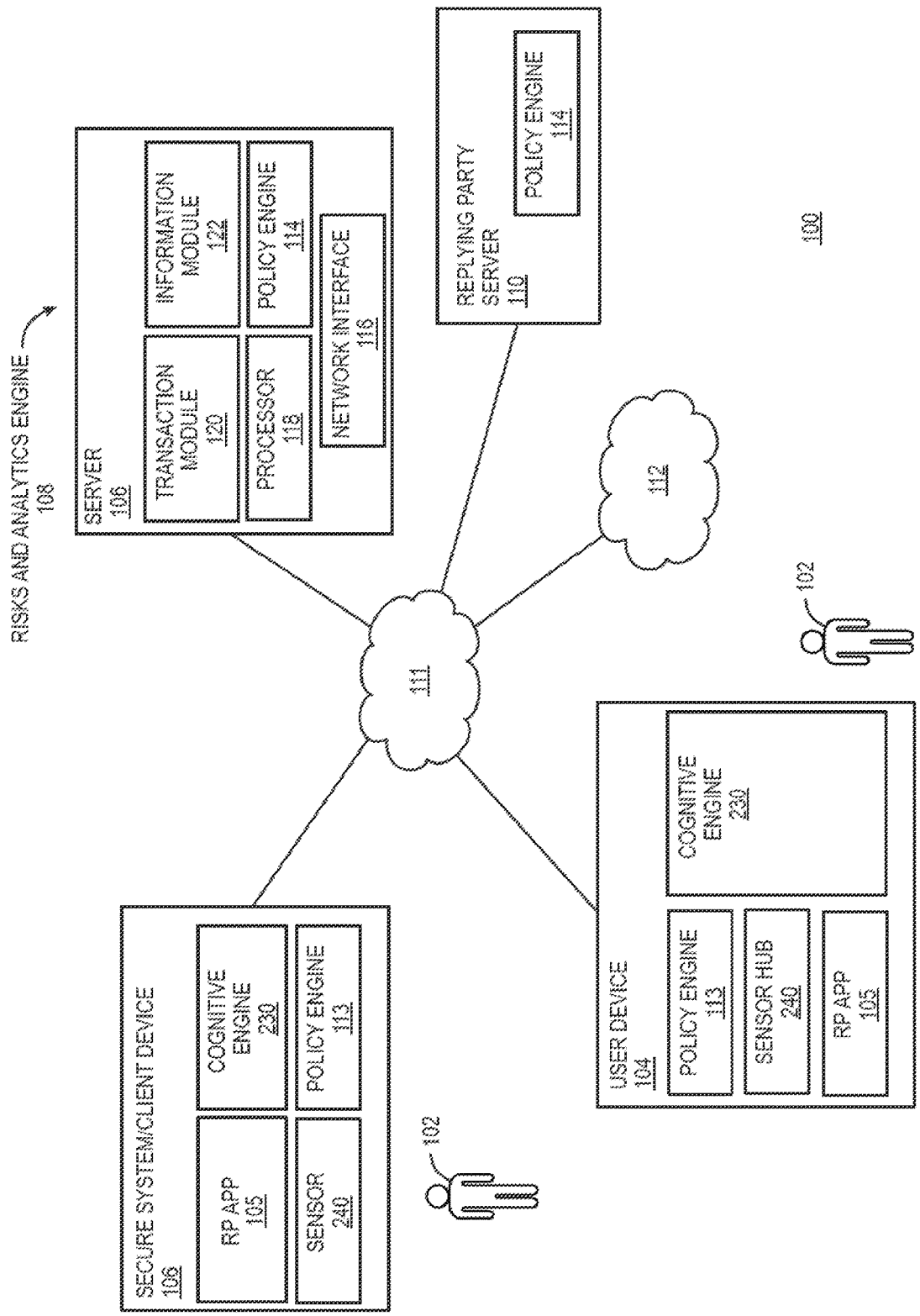
FIG. 1 illustrates a block diagram of an abnormality detection system 100 including users 102, a user device 104, a client device 106, a Risk and Analytics Engine 108, a Relying Party Server 110, a network 111 and cloud storage (or cloud) 112.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Below are example definitions that are provided only for illustrative purposes in this disclosure below and should not be construed to limit the scope of the embodiments disclosed herein in any manner.

Allocentric: in context of transaction it is the other users, devices, or applications and transactions within the overall system in which access and transaction of interest are observed and not necessarily binded to the actual transaction but the concurrent transaction present in the system. Good examples are observation of the traffic in a system independent of the initiated transactor buy the actor of interest but other actors impacting the system load and hence indirectly impacting the current transaction of interest such as Transmission Control Protocol (TCP) synchronize (SYN), Internet Control Message Protocol (ICMP) and user datagram protocol (UDP) flooding, and portscanning, payload signature of system, number of transactions, common IPs, abnormal vs normal behaviors of transaction other than current subject and context of transaction of interest.

Active Session: a user entity is validly logged into an identity provider such as a Relying Party (RP) Services Application.

Attributes: unique identification information associated with a user entity (defined below) such as biometric information, spatial, location and/or behavior, device, browser and network context.

Authentication Assurance: the degree of confidence reached in the authentication process that the communication partner (human or machine) is the user entity that it claims to be or is expected to be. The confidence may be based on the degree of confidence in the binding between the communicating entity and the user identity that is presented.

Egocentric: in context of both physical and cyber transaction is the relation of user, device, or application to the overall system objects and transactions relative to each other vs the egocentric view.

Significant Events: a defined normal (or abnormal) event of interest defined by the policy engine or through the artificial intelligence/machine learning (AIML) cognitive engine that can trigger a condition of interest that demands for change in LOA required (dynamic level of assurance) in realtime initiating a need for response to authenticate, authorize, audit or even denial of service where appropriate.

SIEM: security information and event management is the aggregate security information management and security event management functions into one system to aggregate relevant data from multiple sources, identify deviations from the defined norms and provide an early warning or even take appropriate action as needed to inform enterprise infosec and IT experts of possible threat post event or during.

Spatiotemporal Velocity: user transaction, access and login inference based on time and location and scoring based on proximity, distance of travel and time feasibility.

Contextual Identifiers (or Contextual Factors): may be part of the verification process and may include the following multifactors used singularly or in different combinations: location, biometrics (e.g., heartbeat monitoring, iris recognition, fingerprint, voice analysis, deoxyribonucleic acid (DNA) testing), user entity habits, user entity location, spatial, body embedded devices, smart tattoos, dashboard of user's car, user's television (TV), user's home security digital fingerprint, Domain Name System (DNS), device, browser and network context, remote access Virtual Private Network (VPN), Application usage and habits, data sharing and access fingerprint and the like.

Credentials: may take several forms, including but not limited to: (a) personally identifiable information such as name, address, birthdate, etc.; (b) an identity proxy such a username, login identifier (user name), or email address; (c) some biometric identifiers such as fingerprint or voice, face, etc.; (d) an X.509 digital certificate; and/or (e) a digital fingerprint and approval from a user-binded device, f) behavioral habits of device or user of the device in physical or cyber space, g) behavior of network and applications at the time of user interface with the application and network.

Fingerprinting: collection of Attributes (including actual biometric and device, browser, habits of user and machine on the network and associated fingerprints) that help identify the authentic user and device and system entity.

Identity Assurance: the degree of confidence in the process of identity validation and verification used to establish the identity of the user entity to which the credential was issued and the degree of confidence that the entity that uses the credential is that entity or the entity to which the credential was issued or assigned.

Level of Assurance (LOA): a level of confidence for identity proofing for the binding between level of access for an entity and the presented identity information.

Real Time: the time associated with authorization periods described herein which range depending on the type of transaction, need and urgency for authorization. The authorization time periods may vary from under 10 seconds to 24 hours or more. Real time authorization as used herein prevents fraud at its inception versus mitigating it in a post event notification. In one implementation, real time may refer to the time for the transaction to complete.

Relying Party (RP): could be an entity in multiple sectors requiring secure interactions such as financial institutions, healthcare, retailers, education institutions, government agencies and associated social services, social networks, websites, and the like. A Relying Party will typically use a server (e.g., the RP Server) as a manifestation of its intentions.

Relying Party (RP) Services: can be any transaction including authorized login such as Web or on-premise log-in; Virtual Private Network (VPN) log-in; transaction monitoring; financial transaction for online or a point of sale (e.g., dollar amount, type of transaction including check versus wire versus cashier check); a workflow for approving; viewing or modifying data on a server; access to confidential versus restricted data, and/or physical access control to a secure facility or secure space. RP Services may typically be any web or on-premises service requiring approval for access with dynamic different levels of assurance within. RP Services can be an application (i.e., Relying Party (RP) Services Application) residing on a secure system/client device; be part of an RP Server; and/or be located at a separate server. In addition, an RP Service may be an application executing on a secure system/client device and connected to the RP Server(s) and/or located at a separate server, wherein the RP Server(s) and/or separate server provides the data and executables for providing the service through the application.

Risk Score: a risk score for a threat shall be determined by combining device data, user data and mobile/wearable device data. Various vectors/fingerprint data from the user are combined and converted to a risk score.

Threshold Risk Score: a set score set by system and method 100 to determine whether an entity seeking access is a threat.

User Entity: throughout this disclosure consumer, user, user entity, entity, machine entity, user agent, client, client agent, subscriber, requesting agent and requesting party shall mean the same and may be human or machine.

FIGS. 1-10 show minimizing friction for legitimate user entities via predictive analytics. A simple egocentric view of transaction and scan of a valid authentication is not sufficient, instead a pre-authentication intelligence about the transaction intent, context aware risk based authentication and most importantly a continuous authentication of the transactions through the valid session via detection of the anomalies at every stage including user entity behavior, network traffic (both allocentric and egocentric), user entity devices behavior, user entity habits and transactions associated, the ambient intelligence via Internet of Things (IoT) devices connected to the network and third party data to help classify each transaction risk collectively is employed in the disclosed system and method 100 to deliver cognitive continuous authentications for each session and the transactions within and to classify anomalies and calculate risk at all stages within a session.

The abnormalities detection system and method 100 disclosed herein enables Relying Parties and/or operators of Risk and Analytics Engines 108 to build a predictive analytics engine delivering a dynamic level of assurance technique. Level of assurance (LOA) is a level of confidence for identity proofing for the binding between level of access for an entity and the presented identity information. Dynamic LOA is discussed in U.S. patent application Ser. No. 14/672,098, filed Mar. 18, 2015, having the title "Dynamic Authorization With Adaptive Levels of Assurance", also assigned to Applicant, which is hereby incorporated by reference. The system and method 100 disclosed herein reduces difficulties in gaining access to secure systems and/or facilities (i.e., "friction") for legitimate user entities, elevating trust in platform exchange and injecting preventive flows and measures when encountering potential bad/threat actors. The mobile component of the system and method 100 delivers an end-to-end solution feeding an analytics and early warning system. With connecting device, browser and user habits to the mobile contextual data (e.g., ItsMe™) it is possible to model user entity normal behavior and detect abnormalities.

FIG. 1 illustrates a simplified view of the abnormalities detection system and method 100 including user entity 102, a user device 104, a secure system/client device 106, a Risk and Analytics Engine 108, a Relying Party (RP) Server 110, network 111 and cloud 112 (e.g., remote storage). The user device 104 may be a particular, designated electronic, computational, and/or communication device associated with a user entity 102 who will be seeking access to a secure facility, secure system (e.g., a secure computer system such as secure system/client device 106) or the like. The user device 104 and/or secure system/client device 106 may be registered to a particular user entity 102. For instance, a smartphone may be designated as the device 104. Alternatively, the device 104 may incorporate or function on multiple electronic devices or may be any of a variety of electronic devices 104 a user entity 102 happens to be using at the time (e.g., a fitness device). The network 111 may include or be accessed by WiFi, Bluetooth, radio-frequency identification (RFID), near field communications (NFC), and so forth. Cognitive engine 230 and sensor hub 240 are discussed below in the discussion of FIGS. 2 and 3.

The secure system/client device 106 may be another device upon which the user entity 102 is operating. The secure system/client device 106 may be any suitable electronic, computational, and/or communication device for conducting transactions, such as desktop computer, cash register, kiosk, order terminal, electronic lock, automobile lock, and/or any location or device on which a user entity 102 may seek access to a secure system/client device 106, an electronic location, a secure facility, user information, or other location or item having restricted access. As such, while such a secure system/client device 106 may have a user input device, such as a keyboard or keypad, the user input terminal would not necessarily have the capacity to display messages to a user entity 102 attempting to enter into a transaction. In certain embodiments, the user entity 102 may be an employee, for example, of a government agency, a pharmaceutical or health provider company, a financial institution, or an enterprise with privileged access to highly sensitive assets or data or a client of all above. In such instances, the user entities are pre-authorized and trusted with certain access permissions and credentials such as username and password to access the network or services.

Risk and Analytics Engine (or server) 108 may be operated by or for the benefit of an enterprise which may be any party that may offer a service or control access to a secure facility, secure system/client device 106 or something for which attempts to engage by a user entity 102 may need to be authorized or authenticated. (An exemplary operator of the Engine 108 may be Acceptto™ Corporation through its eGuardian™ service).

Backend Relying Party Server (or servers) 110 may provide a number of different account services, capabilities and information associated with an account or user entity 102. In one embodiment, the RP Server 110 may be owned or operated by a financial institution or any other entity that maintains sensitive data. User device 104 and secure system/client device 106 may have an RP Services Application 105 with various RP Services offered by such a Relying Party which are displayed on the user entity device 104 or secure system/client device 106 after login. The RP Services Application may be provided as a native application, an application running as a cloud service, a web browser interface or another suitable interface on devices 104 and 106. Each RP Service may be associated with a different level of assurance (LoA) of the identity of the user entity 102 accessing the RP Service. For an example, an RP Service such as viewing an account balance has the lowest LOA associated with it, and may be accessible as soon as the user entity 102 enters the login identification (ID) and password for a secure system and the information is verified by the Risk and Analytics Engine 108 and RP Server(s) 110. In contrast, other functions may require higher Level of Assurances (LOAs). For example, changing contact information (LOA N+1), making a payment (LOA N+2) or changing the password (LOA N+3) are RP Services that may require higher LOAs associated with the user entity 102 identity before allowing those functions to be completed where "N" is the base Level Of Assurance for system primary access.

The Risk and Analytics Engine 108 and RP Server 110 may, in various examples, be Machine to Machine Digital Key Authentication (M2M-DKA) servers and may utilize a secure communication protocol over network 111. The Risk and Analytics Engine 108 of abnormalities detection system and method 100 generally, may provide an integrated per-user contextual pattern detection for a secure facility operator or any Relying Party and the customers enabling transparency and detection of attacks and leakage of secure information.

In the illustrated example shown in FIG. 1, the user device 104 and secure system/client device 106 incorporate a policy engine 113 and Risk and Analytics Engine 108 and RP Server 110 incorporate policy engine 114. The policy engines 113, 114 may establish policy orchestration for the abnormalities detection system and method 100 generally. In various examples, the policy engines 113 and 114 may operate as a single policy engine for the system 100 as a whole. Such a single policy engine may be provided by the Engine 108 and RP Server 110 but may receive policy directions from the user device 104 and/or security system/client device 106. In various examples, the policy engine 113 may establish policy orchestration for policies and protocols concerning how and under what circumstances a user entity 102 and/or secure system/client device may be validated. An example would be circumstances in which a user entity 102 request for admittance to a secure facility and/or secure system/client device 106 may be automatically approved or rejected. In various examples, the policy engine 113 may establish policy orchestration for policies concerning the circumstances in which an authorizing party (e.g., secure facility operator) may be required to authorize a transaction of a user entity 102. Policy orchestration is discussed in U.S. patent application Ser. No. 14/444,865, filed on Jul. 28, 2014, now U.S. Pat. No. 9,426,183; which is hereby incorporated by reference in its entirety.

In the embodiment of FIG. 1, the Risk and Analytics Engine 108 includes a network interface 116 coupled to network 111 and a processor 118. The processor 118 may be configured to implement the policy engine 114 as well as a transaction module 120 configured to complete a transaction (or validation) based on a request as received from the user entity 102. The transaction module 120 may further provide automatic authorizations or rejections based on authorization policies. The processor 118 may also be configured to implement an information module 122 configured to transmit information to and receive information from the devices 104 or 106, such as authorization requests and responsive authorization approvals or rejections. Operation of the Risk and Analytics Engine 108 will be discussed in detail below.

Figure 2:
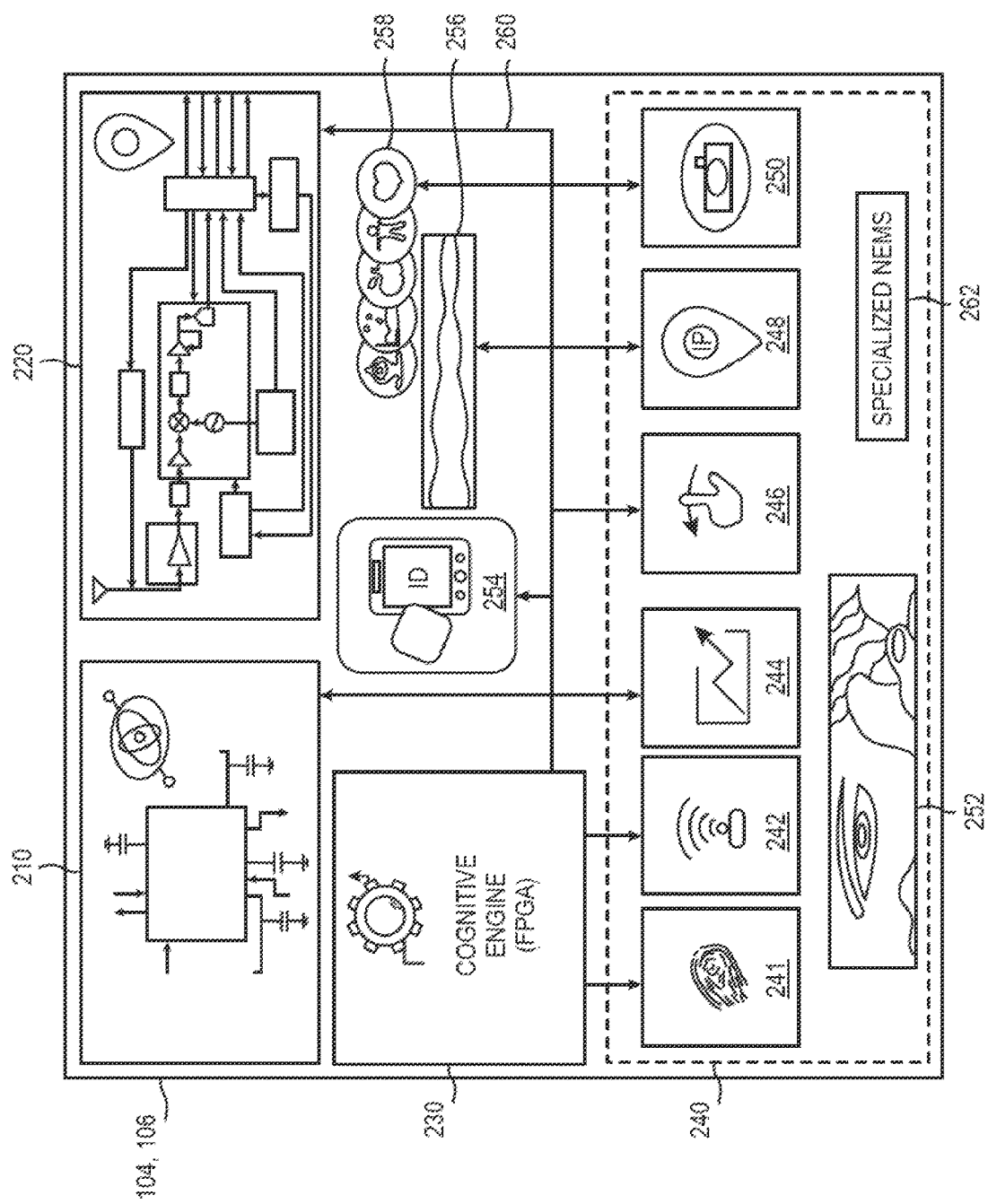
FIG. 2 illustrates a graphical view of components of a user device 104 and/or client device 106 which can track the behavior and habits of a user entity 102.
Figure 3:
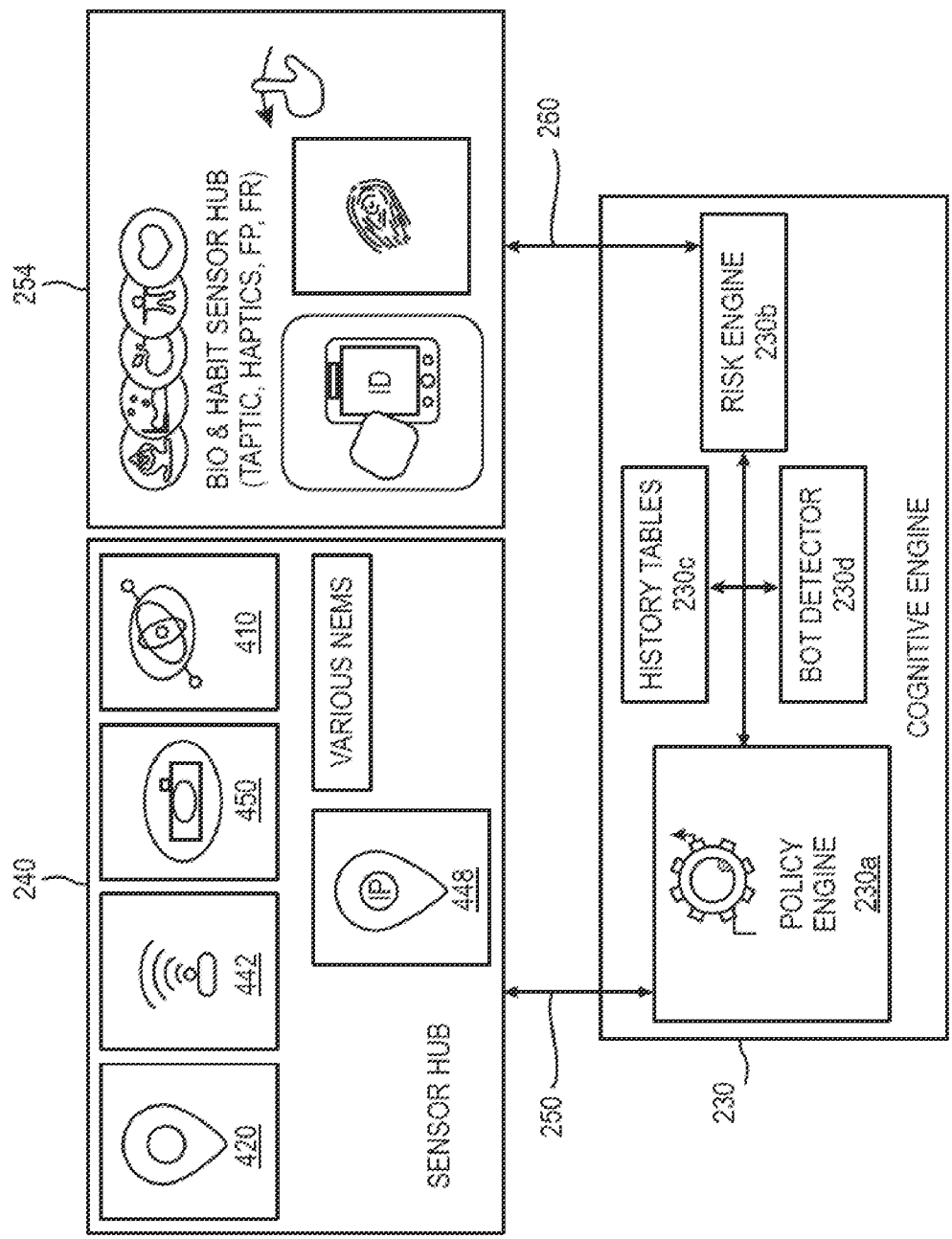
FIG. 3 illustrates a graphical view of more details of a cognitive engine 230 and sensor hub 240 that are part of the devices 104 and 106.

FIGS. 2 and 3 illustrate an example of a user entity device (or user device) 104 and/or secure system/client device 106 that may be used with the abnormalities detection system and method 100 disclosed herein. The user device 104 and secure system/client device 106 can each separately have all or some predetermined subset of components and functionalities as described below. Devices 104 and 106 may be wireless devices with integrated compute capabilities, sensors and at least one field programmable gate array (FPGA) that is programmed with customized biobehavioral compute technology and customized nano-electromechanical systems (NEMS). The devices 104 and 106 may be a laptop computer, cellphone, smartphone (e.g., Apple® iPhone®), a wireless user digital assistant, wireless tablet (e.g., Apple® iPad®), wireless watch (e.g., smart watch and/or sports watch), wearable device (e.g., smart glasses), video game devices, wireless electronic patch, wireless device embedded under the skin, a wearable device mounted on a wristband, a wireless device on the user's clothing, and any other device capable of wireless communications with a network (e.g., the Internet). Either of the devices 104 and 106 alternatively could be a virtual digital tattoo with some radio frequency (RF) capability or alternatively can be a virtual quick response (QR) code. In an operation example, the QR code may be generated for a user entity 102 at the time of entry to a secure facility and is associated with a moving user entity 102 and is continually refreshed to allow for tracking the movement of the user entity 102 tracked, detected and recognized using an ambient intelligence vision system. The virtual QR code will change as the user entity 102 travels through the secure facility. Devices 104 and 106 could be associated with the user entity 102 and include descriptive physical features, clothing and/or the time of arrival at the secure facility. The devices 104 and 106 may also be off the shelf wristbands with specialized applications and algorithms designed and downloaded onto the devices 104 and/or 106. The devices 104 and 106 may additionally or alternatively be an electronic device which is not conventionally mobile, such as a desktop computer and the like.

As shown in FIG. 2, the devices 104 and 106 may include the transceiver equipment of a modern smartphone such as a gyroscope 210 and a global positioning satellite (GPS) 220. The devices 104 and 106 could also have a cognitive engine (or inference engine) 230. Cognitive engine 230 may be an FPGA connected to a biometric, habit sensor and application hub 240. The cognitive engine 230 may include a series of specialized nano-electromechanical systems (NEMS) 262. The FPGA of the cognitive engine 230 may be programmed with customized biobehavioral compute technology. In an alternative embodiment, instead of an FPGA the functions of the cognitive engine 230 may be implemented on other integrated hardware such as specialized ASICs in software.

As shown in FIG. 2, sensor hub 240 is capable of receiving and analyzing inputs from a plurality of sensors and applications. The sensor hub 240 may include sensors for taptics, haptics, finger prints, location coordinates and elevation, user entity 102 habits and facial, voice and ambient noise, magnetic signature, light, air distinct characteristics like humidity, carbon monoxide, and as such, or all other recognition sensing capabilities. The sensors in the hub 240 may also include customized NEMS. The sensors may be discrete or integrated into the sensor hub 240. The sensor hub 240 may include a finger print input sensor 241 for a biometric input. The hub 240 may include a wireless detection sensor 242 that may be used to analyze a variety of wireless communication parameters such as a Service Set Identifier (SSID) and their associated Attributes such as signal strength and proximity to in use WLAN, LAN or WIFI access points. The information from the hub 240 is collected and analyzed in cognitive engine 230 to provide a risk score (which will be discussed further below) in evaluating the level of verification of the user entity 102 of the devices 104 and 106 and whether he or she (or machine entity) is the correct entity.

Reference item 244 indicates an analytical engine which is configured to receive input from the other sensors in the sensor hub 240 to monitor the user entity spatiotemporal and behavior patterns and habits to determine if the user entity 102 of either of the devices 104 and 106 is the correct entity. For example, habits might include environmental and/or behavioral patterns of the user entity 102 of the devices 104 and 106 such as the time the user entity 102 wakes up, arrives at the gym, and/or arrives at the secure facility and the like. Sensor 246 is used to measure gestures regarding how the user entity 102 handles the devices 104 and 106. For example, these gestures might include how the user entity 102 swipes the screen of the devices 104 and 106 with their finger including pressure, direction, right handed vs. left handed, and the like. In addition, sensor 246 may measure the electromagnetic signature of the operating environment of the devices 104 and 106 to determine if it fits a profile for the user entity 102. For example, the subscriber identification module (SIM) card and mobile identification of the devices 104 and 106 combined with the background electromagnetic factors may all be used in a verification process that the user entity 102 of the devices 104 and 106 is the correct entity. Reference item 248 measures an IP address being used by the devices 104 and 106 and may use a look up feature to verify the devices 104 and 106 are in a region typically occupied by the user entity 102. Camera 250 may be used for facial recognition of the user entity 102 and other biometric inputs such as a tattoo or the like. In addition, the camera 250 may be used to capture a background of the user entity 102 of the devices 104 and 106 to determine if it is an environment in which the user entity 102 oftentimes is found (e.g., a picture hanging behind the user entity 102 of the devices 104 and 106 may conform to a user entity 102 profile). Iris scanner 252 may be used to confirm through an eye scan the identity of the user entity 102. Reference item 254 indicates the devices 104 and 106 "unique identifications" which may be tied to a SIM card number and all associated unique signatures, an International Mobile Equipment Identification (IMEI) number, an Apple® identification, a telecommunications carrier (e.g., AT&T®, TMobile®, Vodafone®, Verizon®), battery serial number or the like. Ambient noise sensor 256 measures the noise levels surrounding the devices 104 and 106 including noises from nature and manmade noises (including communication equipment produced radio frequency noise). Ambient sensor 256 may also be able to measure a speaking voice to create a voiceprint to be able to verify that the user entity 102 is authentic. Reference item 258 is an application that measures the "wellness" of the user entity 102 of the devices 104 and 106 including heart rate, sleep habits, exercise frequency, and the like to gather information on the devices 104 and 106 and the users lifestyle to contribute to verification decisions. Bus 260 couples the sensors and applications of the hub 240 to the cognitive engine 230.

FIG. 3 shows a more detailed view of the cognitive engine 230 and sensor hub 240. The cognitive engine 230 includes a policy engine 230a, a risk engine 230b, history tables 230c, and bot detector 230d. The policy engine 230a sets the factors in evaluating the risk when receiving input from the sensors and applications on the sensor hub 240. The risk engine 230b calculates the information received from the sensor hub 240 and makes a determination regarding a risk score in regard to the current user entity 102 of the devices 104 and 106. The history tables 230c record the user's habits of the devices 104 and 106. The bot detector 230d determines whether a computer program is attempting to trick the mobile devices 104 and 106 into thinking it is a legitimate user entity 102 by simulating the device owner activities and is attempting to conduct a verification without the actual owner. In one implementation, the bot detector 230d monitors which applications typically operate on the devices 104 and 106 and if it discovers a new application residing and running beyond the routine, it raises a risk level warning that something unusual is happening with the devices 104 and 106. Overall, the cognitive engine 230 assists the Risk and Analytics Engine 108 in determination of the type of authentication required based on risk score.

Figure 4A:
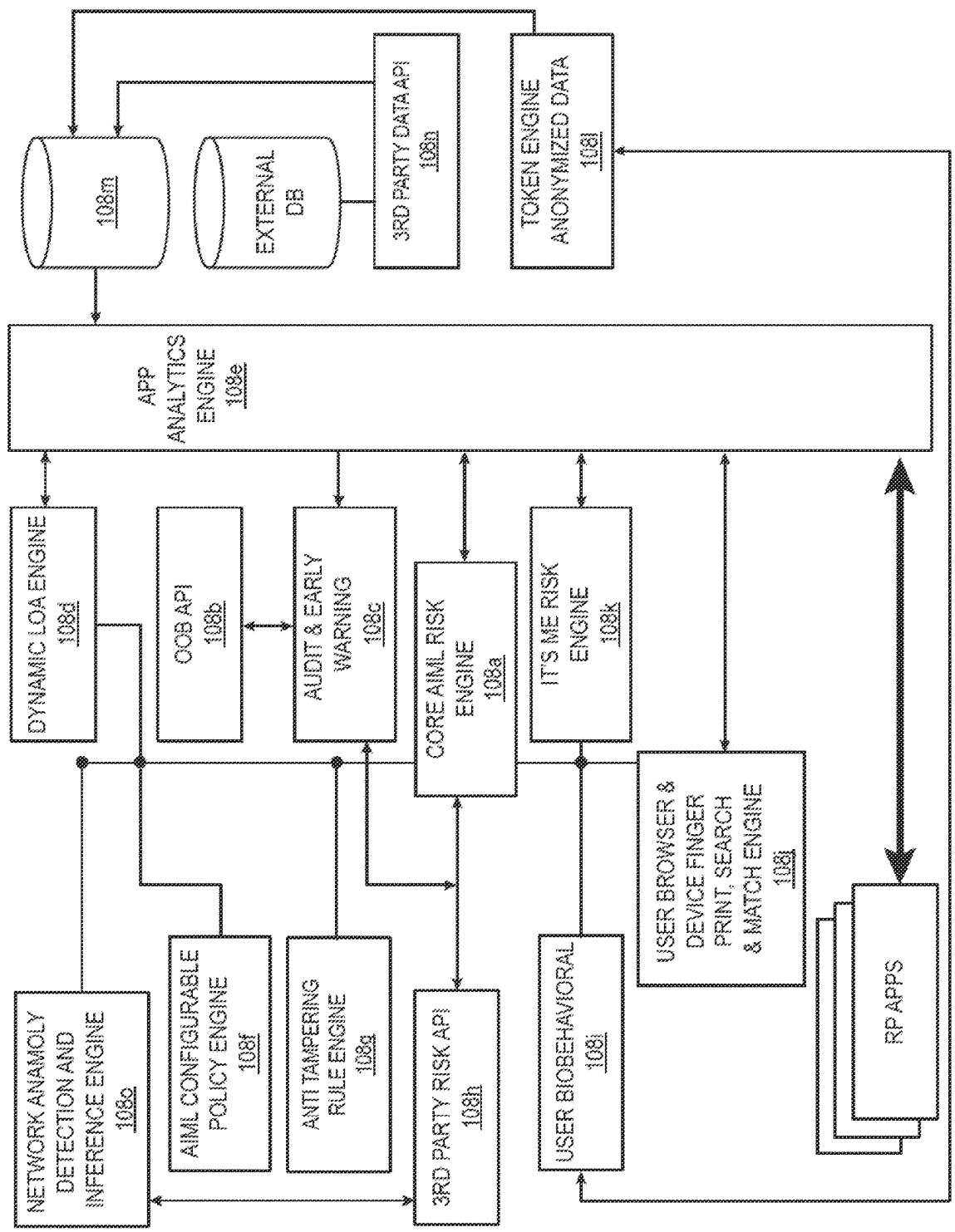

FIG. 4A shows details of Risk and Analytics Engine 108. The Engine 108 includes a Core AIML Risk Engine platform core component 108a (e.g., eGuardian®). FIG. 4A broadly illustrates how individual system elements may be implemented in a relatively separated or relatively more integrated manner. The Engine 108 includes user entity behavior analytics module 108b and a user, behavior, traffic, device fingerprint analytics 108c. These elements 108b and 108c of Engine 108 support a method to promote locations, machines and time and classifications of the type of transactions to trusted events based on contextual factors such as habits, location, devices and browsers and other factors that can uniquely identify legitimate users using behavioral modeling and context versus threat actors who cannot provide similar behavioral and contextual factors in spite of possession of other binary identity attributes and credentials. Core AIML Risk Engine 108a may establish the normality of events, distinguish significant events that can be classified (normal versus abnormal) and enable calculation of the risk score of each access and/or transaction with the secure facility or the secure system/client device 106 and the transactions through the different stages and life cycle of access management including pre-authentication, at authentication and post authorization to deliver a cognitive continuous authentication system. The Core AIML Risk Engine 108a operates by analyzing and verifying users identity, inferring contextual data such as user device 104 and browser attributes, spatiotemporal velocity, and user entity 102 habits. User entity habits may be analyzed by using user entity device 104 and secure system/client device 106 and sensor hubs 240. The Core AIML Risk Engine 108a may be a network allocentric or egocentric anomaly detection engine including data sources from the rest of platform stack such as Security Information Event Management (SIEM), Data Loss Prevention (DLP) or Privileged Access Management (PAM) tools to generate a biobehavioral derived score that is used to maintain the biobehavioral derived credential validity per transaction or mass volume of transactions in case of targeted broad brute force attacks such as credential stuffing. The biobehavioral derived credential validity may be needed to request for authorization in case of loss of confidence, demand for higher level of assurance, or to terminate access by resetting the derived key based on programmed policies of the policy engines 113, 114.

Both user device 104 and secure system/client device 106 have a cognitive engine 230 used in verifying the identity of the user entity 102. In FIG. 1, data from other sources such as internet of thing (IoT) devices that grab additional ambient intelligence may also be fused into the system and method 100. These IoT devices can be ambient third party data sources such as outside camera systems, WiFi scanners, and/or Bluetooth low energy scanners. These devices monitor the user entity 102 as the user entity 102 traverses during the day both in physical and cyberspace recognizing the user entity 102 transit sequence, location, phone spatiotemporal and usage, face, and the like which are all used to physically verify that the user entity 102 was really there in the location of interest or importance versus user's digital persona and identifications (IDs) which can be injected into the system 100 electronically and make a synthetic signature of a user entity 102.

The Risk and Analytics Engine 108 as shown in FIG. 4A has the following plurality of platform core capabilities. One, obfuscation to harden against commonality analysis and detection by fraudsters. Two, classification through common fields versus distinguishable fields. Three, at least one application programming interface (API) to send and receive encrypted data from third party providers. Four, significant analytics and inference capabilities to feed to a Level of Assurance (LOA) engine 108d including font detection; device operating system (OS) version, central processing unit (CPU) model, canvas, native fingerprinting plugins; proxy detection; and/or communication and connectivity capabilities and service delivery and application programming interface (API) mechanisms to aggregate data from relying party applications, the third party database and risk engines like various secure information and event management (SIEM) providers. At the core of the Engine 108 may be an artificial intelligence/machine learning analytics and risk engine 108*a* that processes and analyzes the various data sources including data from Third Party Risk API 108*h*, Network Anomaly Detection & Inference Engine 108*0*, and User Biobehavioral Engine 108*i* by measuring parameters that identify different classes of network attacks and anomalies at the time of any given set of transaction as both allocentric parameters of the traffic feeding into the inference engine as well as user entity behavior fingerprints. At the network level, this inference is achieved for attacks such as Transmission Control Protocol (TCP) synchronize (SYN), Internet Control Message Protocol (ICMP) and user datagram protocol (UDP) flooding, and portscanning as examples of classes measured by metering the number of flows with similar patterned payloads to the same destination socket, measuring total volume of flows in bytes and the average packets in flows and hence allowing to establish a distinct behavior by plotting a pattern of normal traffic. Other allocentric parameters of interest may include number of flows that have a similar volume, same source and destination address, but to various different ports. At the user entity behavior level this inference establishes normality of a user entity behavior such as their trusted location and user entity spatiotemporal velocity. Also, in other examples, location and proximity inferences of user entity devices 104 versus their client device 106 initiated transactions versus last event of interest including an authentication event or other significant events such as major Internet Protocol (IP) change, policy change, or ambient gross violation such as location-time violation that are provisioned by artificial intelligence and machine learning (AIML) configurable policy engine 108*f* and fingerprinted by User Browser Traffic Device (UBTD) Search & Match Engine 108*j*.

Referring to FIG. 4A, the trust level of the data collected by the Core AIML Risk Engine 108*a* is a derived confidence score that depends on Anti Tampering Rule Engine 108*g* and the mobile application It'sMe™ Risk Engine 108*k* which is all fed into the business application Analytics Engine 108*e*. Analytics Engine 108*e* calculates the risk versus friction and triggers an Audit & Early Warning Engine to initiate an appropriate out of band transactions to inform good users of the intent via an Out Of Band (OOB) API 108*b*. OOB API 108B may use a mobile app, mobile device, and other methods of notification to receive a push notification or other methods of authentication such as OTP SMS/email/call or Timebased One Time Passwords (TOTP).

The data stored in the system data base 108*m* may contain personal identifier and sensitive private information that needs anonymization. These are tokenized and hashed in transit and at rest via the anonymization token engine 108*l* as a function of Relying Party privacy rules and guidelines and regional laws all via AIML Configurable Policy Engine 108*f*. Third party data about user entities, devices, and transactions are made available via third party data APIs 108*n* enabling a cross company-industry data fusion which can provide black lists or white lists again via Policy Engine 108*f*.

Figure 4B:
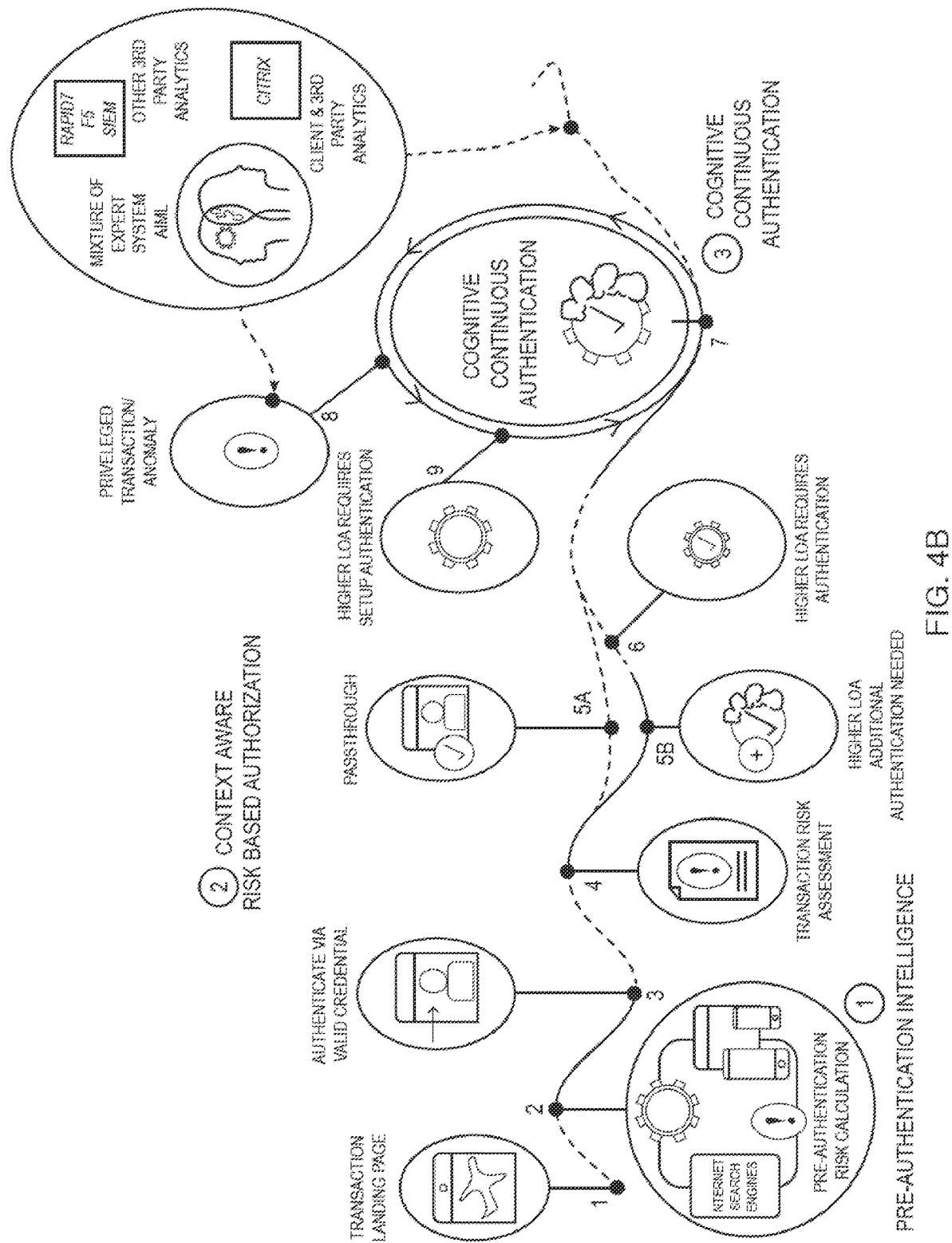
FIG. 4B shows the user entity 102 journey where the pre-authentication intelligence allows the Risk and Analytics Engine 108 to predict and classify the user entity.

FIG. 4B shows the user journey where the pre-authentication intelligence allows the Engine 108 to predict and classify the user (bot versus a good user versus a threat actor versus a suspect device/user/browser). The data collection on user entity behavior, device, and transaction risk is collected and results in a context aware risk based authentication which can balance risk versus friction for class of good users versus additional friction for threat actors including denial of service or a step up authentication for suspect/new/high risk transactions. It is significant that post authorization in FIG. 4B the user entity 102 and their transactions may be continuously monitored and a dynamic level of assurance and even a denial of service is injected when the risk is calculated to be too high with aggregate of the Engine 108 and third party data provided by other analytics and risk engine platforms such as SIEM solutions as illustrated delivering the cognitive continuous authentication that minimizes risks even post authorization by detecting anomalies through life cycle of a transactions and provides a novel technique to detect abnormal behavior and report to IT and users of the services protected by Engine 108.

FIG. 5 is a block diagram illustrating in a more detailed manner the components of Risk and Analytics Engine 108 and RP Server 110, according to some example embodiments, which are able to able to read instructions from a machine-readable medium (e.g., a machine-readable storage medium) and perform any one or more of the methodologies discussed herein. Engine 108 and RP Server 110 may be independent of a secure system/client device 106, secure facility and/or Relying Party or controlled by the operator of the secure system/client device 106, secure facility and/or Relying Party. Specifically, FIG. 5 shows a diagrammatic representation of the Engine 108 and RP Server 110 in the form of a computer system and within which instructions 524 (e.g., software) for causing Engine 108 and RP Server 110 to perform any one or more of the methodologies discussed herein may be executed. In alternative embodiments, the Engine 108 and RP Server 110 operate as standalone devices or may be connected (e.g., networked) to other machines. In a networked deployment, the Engine 108 and RP Server 110 may operate in the capacity of a server machine or a client machine in a server-client network environment, or as a peer machine in a peer-to-peer (or distributed) network environment. The engine 108 and/or RP Server 110 may be a server computer, a client computer, a user personal computer (PC), a tablet computer, a laptop computer, a netbook, a set-top box (STB), a user digital assistant (PDA), a cellular telephone, a smartphone, a web appliance, a network router, a network switch, a network bridge, or any machine capable of executing the instructions 524, sequentially or otherwise, that specify actions to be taken by that server. Further, while only a single server is illustrated for Engine 108 and/or Relying Party Server 110, the term "server" shall also be taken to include a collection of servers that individually or jointly execute the instructions 524 to perform any one or more of the methodologies discussed herein.

The Engine 108 and RP Server 110 include a processor 118 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The Engine 108 and RP Server 110 may further include a graphics display 510 (e.g., a plasma display panel (PDP), a light emitting diode (LED) display, a liquid crystal display (LCD), a projector, or a cathode ray tube (CRT)). The engine 108 and RP Server 110 may also include an alphanumeric input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a speaker), and network interface device 116.

The storage unit 516 includes a machine-readable medium 522 on which is stored the instructions 524 (e.g., software) embodying any one or more of the methodologies or functions for operation of the abnormality detection system and method 100 described herein. The instructions 524 may also reside, completely or at least partially, within the main memory 504, within processor 118 (e.g., within the processor's cache memory), or both, during execution thereof by the Engine 108 and RP Server 110. Accordingly, the main memory 504 and processor 118 may be considered as machine-readable media. The instructions 524 may be transmitted or received over a network 526 via network interface device 116.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a server (e.g., Engine 108 and RP Server 110), such that the instructions, when executed by one or more processors of the machine (e.g., processor 118), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Substantial variations may be made in accordance with specific requirements to the embodiments disclosed. For example, customized hardware might also be used, and/or particular elements might be implemented in hardware, software (including portable software, such as applets, etc.), or both.

FIG. 5 further shows that in alternative embodiments, the computing device can represent some or all of the components of the engine 108 and RP Server 110. The computing devices alternatively could function in a fully virtualized environment. A virtual machine is where all hardware is virtual and operation is run over a virtual processor. The benefits of computer virtualization have been recognized as greatly increasing the computational efficiency and flexibility of a computing hardware platform. For example, computer virtualization allows multiple virtual computing machines to run on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software running on hardware platform, and one or more virtual machines running on hardware platform by way of virtualization software. Virtualization software is therefore logically interposed between the physical hardware of hardware platform and guest system software running "in" virtual machine. Memory of the hardware platform may store virtualization software and guest system software running in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system—the "host operating system"—such as Windows or Linux to manage system resources. In a hosted virtualization system, the host operating system may be considered as part of virtualization software.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

FIGS. 6-10 disclose further operations of the abnormalities detection system and method 100. The abnormalities detection system and method 100 may use browser and device fingerprinting combined with user behavioral analytics from user entity devices 104 and secure system/client devices 106 to both access the services as well as the user entity devices 104. As discussed above, phones, desktop personal computers (PCs), laptop PCs, and/or smart devices (e.g., watches with sensing and computation capabilities) all can be used to profile and identify legitimate clients or employees before granting access to computing systems, confidential financial information, secure facilities, restricted areas and the like. The system and method 100 of the following embodiments provide a set of predictive analytics data that are derived from a plurality of different sources such as browser fingerprints, device fingerprints, and/or mobile inferred behavioral data. In at least one embodiment, three of these sources will be used. This enables login-signup or lifecycle management flows of target privileged accounts, websites and other identity access controlled platforms to measure risk and inject appropriate friction. Thus, allowing Relying Parties such as data or service providers to identify legitimate traffic and grant services while classifying suspicious visits and prevent threat actors.

For online transactions, be it financial transactions, data mining, or simple logins, physical access control system, workflows, identity proofing the user entities (human or non-human) 102 need to identify themselves on-premises or remotely and reliably with a certain required degree of certainty. The desired level of assurance (LOA) of each associated transaction or session, for example at login or individually within a login session may vary and hence require real time response as a function of the associated LOA required for each transaction or each level of access within the session. For example, a login session for an online banking service (a typical example of a Relying Party) may require not only a credential-based trust model (e.g., simple user name and password) for general login and looking at balance history but may need a dynamic transactional-based model where additional factor(s) are required to transact a transfer or payment. Upon the initiation of a transaction with a higher LOA for the session login, the abnormalities detection system and method 100 may ask the user entity 102 for additional verification to authorize the transaction. Upon completion of a transaction the session credential will resume to baseline credential based at the lower LOA till the next transaction and associated LOA is presented or perhaps the session is terminated per policies orchestrated (e.g., time of inactivity). In this description, "time to live" is the pre-determined time that the attributes or verified credentials are valid for. Periodically, an LOA Server will perform a "refresh" to update at least some of the plurality of verified attributes and the verified credentials based on predetermined policies and on demand from the Risk and Analytics Engine 108 and RP Server 110. In the online banking example, to authorize the login and access to account balance versus a transaction, such as an online payment, the system and method 100 disclosed herein may require different LOAs with different types of multifactor authentication and out of band identity proofing such as using a combination of contextual information such as location, biometrics and digital fingerprint of a user-binded LOA Provider device, such as a smart phone or wearable with a unique set of attributes and capabilities.

The user entity 102 with a particular identity made by some entity can be trusted to actually be the claimant's "true" identity. Identity claims are made by presenting an identity credential to the Relying Party Server 110. In the case where the user entity 102 is a person, this credential may take several forms, including but not limited to: (a) personally identifiable information such as name, address, birthdate, etc.; (b) an identity proxy such as a username, login identifier (user name), or email address; (c) biometric identifiers such as fingerprint or voice, face, etc.; (d) an X.509 digital certificate; and/or (e) a digital fingerprint and approval from a user-binded device.

Note that Identity Assurance specifically refers to the degree of certainty of an identity assertion made by an identity provider which may be machine, service or user by presenting an identity credential to the Relying Party. In order to issue this assertion, the identity provider must first determine whether or not the claimant requesting the transaction possesses and controls an appropriate token using a predefined authentication protocol. Depending on the outcome of this authentication procedure, the assertion returned to the Relying Party by the identity provider allows the Relying Party to decide whether or not to trust that the identity associated with the credential actually "belongs" to the person or entity presenting the requested credential.

Figure 6:
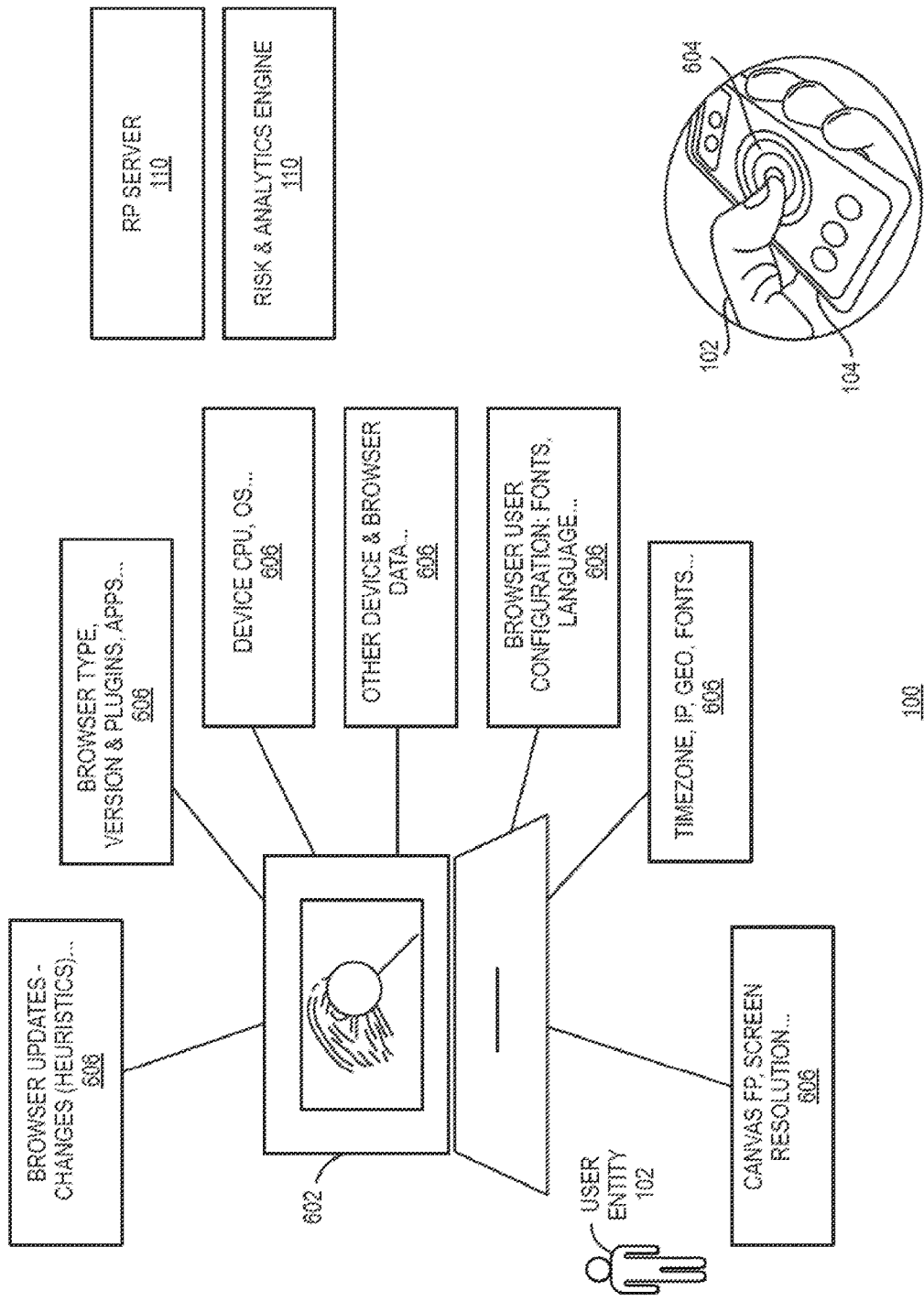
FIG. 6 shows a schematic of another view of the abnormalities detection system and method 100.

FIG. 6 shows another view of the abnormalities detection system and method 100 used in calculating individual transaction risk based on contextual factors such as user entity behavior, device, browser, and the network traffic and request for authentication by account owner when risk greater than allowed. Secure system/client device 106 is in the form of a desktop PC having a browser 602. FIG. 6 further shows a user device 104 in the form of a mobile device which also may have a mobile browser 604 (e.g., smart phone such as Apple® iPhone®). A user entity 102 can use either device 104 or 106 separately or at the same time. Both user devices 104 and 106 are coupled to Risk & Analytics Engine 108 (e.g., eGuardian® server) and a Relying Party Server 110. The user entity 102 behavior patterns (e.g., habits) with devices 102 and 104 and attributes of the devices 104 and 106 can be measured by the Risk & Analytics Engine 108. Recording these attributes create a "normal", risk threshold. The user devices 104 and 106 collectively gather data based on user entity 102 behavior and create or augment a behavioral based identity for the user entity 102. In one embodiment, the collection or gathering of user entity 102 behavior data may be performed using a secure operator application installed on the devices 102 and 104. Components of the abnormalities detection system and method 100 of the present embodiments include:

i) mobile device data; ii) behavior inference using both mobile device 104 and secure system/client device 106; and iii) portal device and browser finger printing combined which enables an assembly of data about user entities 102 of all types and their devices 104 and 106. The data is captured for real-time and post analytics and hence unleashing the power of predictive analytics to prevent fraud.

Examples of data captured such as behavior patterns and attributes 606 may include the following. First, device (104 and 106) and browser fingerprints that uniquely identified a device, browser, network, habit of user on the device (104, 106) used for accessing compute and data and services. Devices 104 and 106 have footprints that may include browser (602 and/or 604) attributes such as screen size, screen resolution, font, language, and browser version. Second, central processing unit (CPU) and operating system changes not okay but browser upgrade may be okay. Third, user entity behavior and habits and inference of the user entity normal behavior, to identify risks associated with transactions. Fourth, trusted devices are devices that have been repeatedly authenticated over a period of time. The number of top trusted devices may limited to a number (e.g., 5). Fifth, a risk based authentication system that uses mobile device or other modalities of verification such as email, short message service (sms), voice, push, and voice call to promote locations, machines and time and type of transactions to trusted events/habits of user entities 102. The system and method 100 allows for calculating individual transaction risk based on contextual factors such as user behavior, device, browser and the network traffic and request for authentication by account owner when risk greater than allowed threshold. Sixth, a PC desktop that has not been used for a long period of time (e.g., days or weeks) will be dropped from a trusted device list. Seventh, location which may be found by Internet Protocol (IP) reverse lookup of Internet Service Provider (ISP). Eighth, user entity 102 behavioral footprint on desktop PC (client device 106) such as speed of user entity 102 typing, number of hours and time intervals user is on this device (e.g., iMac® at home is usually used in evenings and weekends; use of touch screen feature). Ninth, user entity 102 behavior footprint might also include: time of use, location of use; hardware (including auxiliary devices such as type of keyboards, mouse, and user behavior on both); browser specific data such as browser updates and changes (i.e., heuristics), browser type, browser version, plug-in and applications; brand and type of CPU, operating system; browser user configuration such as fonts (e.g., expected fonts versus user configured fonts), language and the like; Canvas financial planning, type of display, screen resolution; and/or time zone, internet protocol (IP) address, geographic location. Tenth, code in the browser (e.g., JavaScript code) and/or installed on the device (104, 106) executing on the computer collects data from the desktop 106 may be used. Eleventh, with regard to the mobile device 104 footprint it may include subscriber identity module (SIM), international mobile equipment identity (IMEI), applications on the device, and/or secret keys. Twelfth, with regard to the mobile device 102 it be derived behavior footprint such as location, habits, walking gait, exercise, how any times you call your top contacts (e.g., top 5 contacts). Thirteenth, the sequence of events and derived context of normal versus abnormal may also be considered.

Figure 7:
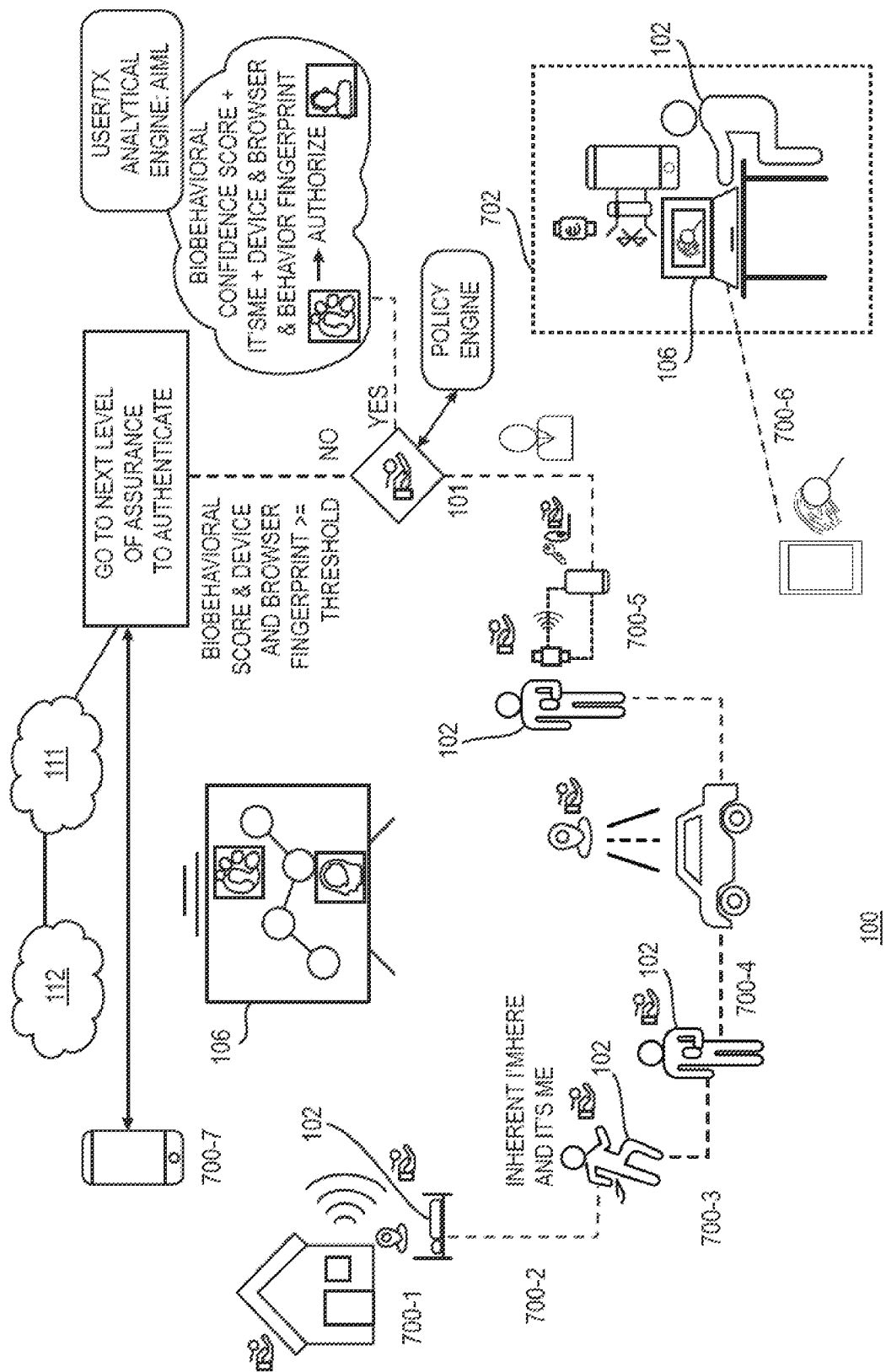
FIG. 7 shows a schematic of a more detailed view of the system and method for abnormalities detection 100.

FIG. 7 shows a view of the system and method for abnormalities detection 100 in operation which collects user entity 102 behavior based information for providing and restricting access to a secure website or computer network and its assets to a user entity 102. In FIG. 7, the system and method 100 identifies user device 104, secure system/client device 106, browser (602, 604), and user entity 102 behavior unique attributes. Risk and Analytical Engine 108 stores and later matches to infer change upon consequent transactions and measuring transaction risk through a search and match against classified set of static and dynamic attributes using UBTD Engine 108*j*. As discussed above, the abnormalities detection system and method 100 will track user behavior based on user entity 102 habits, cyber transactions and device (104, 106) access. The user device 104 accompanies the user entity 102 in their daily activities. The system and method 100 will further determine a confidence score associated with each transaction executed on devices 104 and 106. User habits and fingerprinting are captured with the ability to detect abnormalities through artificial intelligence markup language (AIML) using user device 104. The movement and actions of user entity 102 may be tracked throughout their activities for a predetermined time period (e.g., a day). FIG. 7 further shows a user entity 102 sleeping (step 700-1), running (step 700-2), having coffee (step 700-3), traveling to work (step 700-4), having coffee again (step 700-5) and sitting at a desk at work (step 700-5). Behavioral information may further include data related to the user entity 102 based on sensor information, such as, but not limited to WiFi, Bluetooth®, and/or motion sensors (e.g., accelerometers, gyroscopes, magnetometers) in user device 104. In addition, physiological patterns associated with a user entity 102, such as walking gait, breathing pattern, sweating pattern, and heart rate may be included as part of the behavioral profile for a behavior based identity for a user entity 102. Higher level behavior inferences such as location that the user entity 102 slept in, time duration that the user entity 102 slept for, the location user entity 102 slept at, running/exercise schedule, locations the user entity 102 visited prior to reaching work (e.g. user car, coffee shop, gym, etc.), surfing patterns on the user device 104, travel time to or from known trusted location 702 (e.g., secure facility), and proximity verification on trusted location 702 may be recorded. The behavioral data may be continually collected at least till the user entity 102 reaches their work place 702 (e.g., a secure facility). The operator of the facility 702 may issue a user device 104 that is a mobile device 104 that is trusted by a secure facility operator to gather user behavior information and the mobile device 104 may have a mobile device manager (MDM) installed to ensure certain policies associated with the use of the mobile device 104. All of the behavioral patterns may be collected and stored in the Risk and Analytics Engine 108, the RP Server 110 and/or in the cloud 112.

Figure 8A:
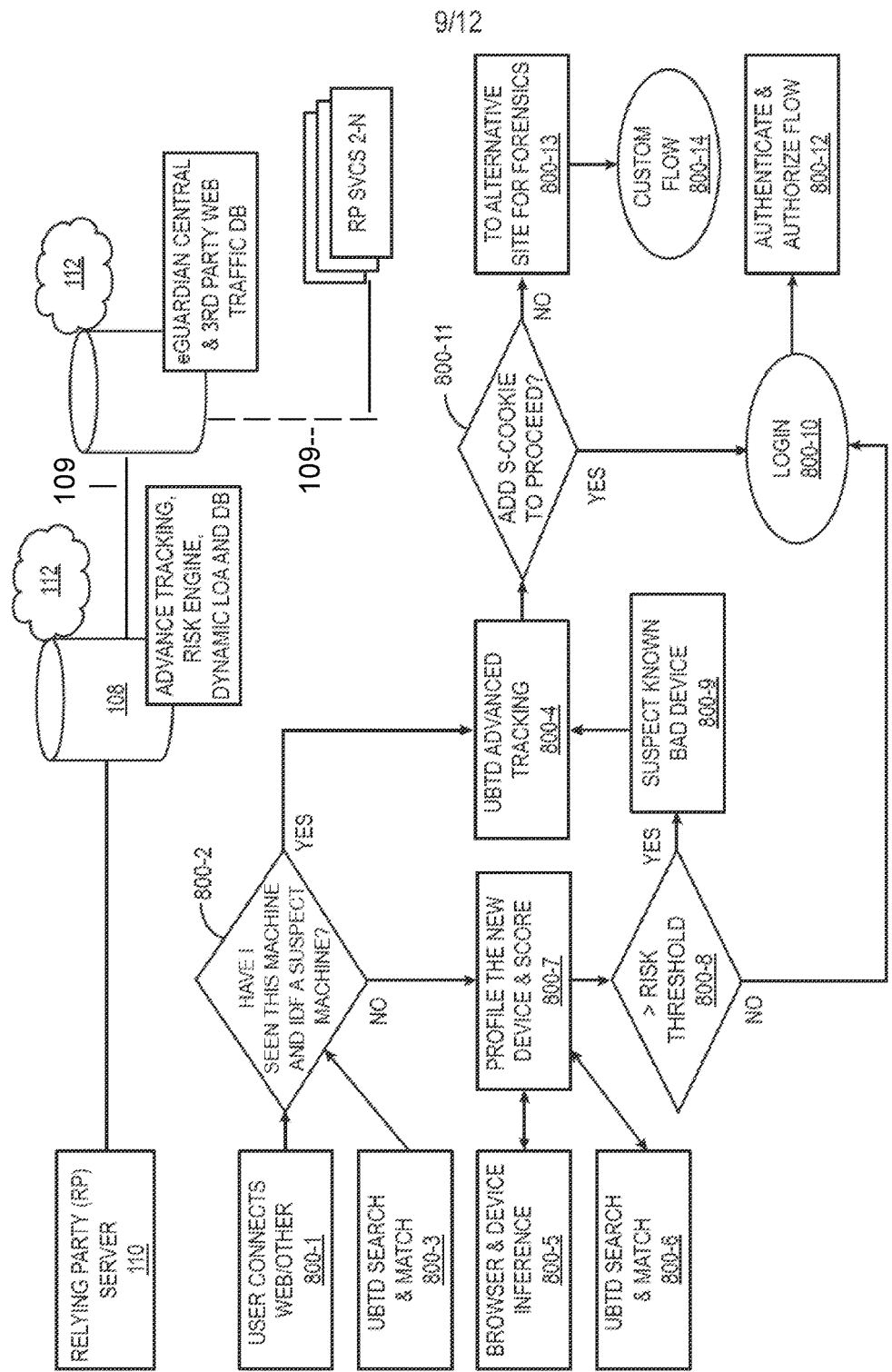
FIG. 8A shows a schematic view of the details of Risk and Analytics Engine 108 used to identify user device 104, browser, and behavior unique attributes, storing and later matching to infer change upon consequent transactions and measuring transaction risk through a search and match against classified set of static and dynamic attributes using a user 102, browser finger print, browser traffic, device search and match engine.

FIG. 8A shows the details of operation of Risk and Analytics Engine 108 used to identify user device 104, browser (602, 604), and behavior unique attributes. The Engine 108 will store and later match against a central database to infer change upon consequent transactions and measuring transaction risk through a search and match against classified set of static and dynamic attributes using UBTD Engine 108*j*. The central database of Engine 108 is capable of tracking across organizations and relying parties tracks web traffic of various users, devices and browsers. The risk, behavior, and dynamic level of assurance (LOA) and graphs commonalities allows cross organizations identification of both threat actors and any similarities of syndicated attacks, and equally recognition of the good and safe actors across independent web applications and services. This method allows the deep commonality analysis of users, devices, browsers, behavior, threat scores and factors which may be independent of different user personas and claimed user identities. The block diagram of FIG. 8A reflects the flow of data from different modules to the Risk and Analytics Engine 108. Reference 109 indicates the connection between the relying party services 2-N and eGuardian central and third party web traffic database and Engine 108. This connection 109 allows correlation and recognition of syndicated attacks by threat actors. The idea of user entity 102 behavioral, device and browser fingerprint in general is to identify legitimate traffic and obtaining indication of correct flow signature on progression of landing on a portal or web page. This is compared to the backdoor application programming interface (API) techniques that fraudsters use given they are aware that they are being fingerprinted their path. In the steps of FIG. 8A, one device or several devices (104, 106) collectively gather data based on the user entity 102 behavior and create or augment a behavior based identity for the user entity 102. In one embodiment, the collection or gathering of data may be performed using a secure operator application (e.g., Relying Party Application 105) installed on device 104 or 106. In certain instances, the user device 104 may be a mobile device that is either issued or trusted by the workplace 702 of the user entity (e.g., secure facility) operator to gather user behavior information. The mobile device 104 may have a mobile device manager (MDM) installed to ensure certain policies associated with the use of the mobile device.

In step 800-1, user entity 102 attempts to connect to RP Server 110 but is also connected to Risk and Analytics Engine 108 using the network 111. Risk and Analytics Engine 108 uses inferences on abnormalities to measure transaction risk for both forensics and injected required level of authentication. Upon first transaction and engagement by a user device 104 in step 800-1, the system and method 100 determines if the device 104 has been seen before (step 800-2) or is a suspect device. In step 800-3, a test and a User Browser Traffic Device (UBTD) search & match is performed in UBTD Search and Match Engine 108*j* to determine if the device (104 and/or 106) has been seen before and is a suspect machine. If yes, in step 800-4, the system proceeds to UBTD Advanced Tracking which will be discussed in detail below. If no, in step 800-5, a browser and device inference is made in which behavior information, browser and device (104, 106) attributes are collected by the Engine 108. There is conducted a profiling process to determine if a first time visitor is either clean, normal device and browser or if it is not. In the profiling process there is captured a significant number of device 104 and browser 604 data points that can uniquely identify the user entity 102 and/or user device 104. There is also captured a set of user behavior unique characteristics derived from both mobile authenticators and when provisioned and allowed (a user option). As the visitor traverses the site the system and method capture and identify if they need to be on the watch list.

Figure 8C:
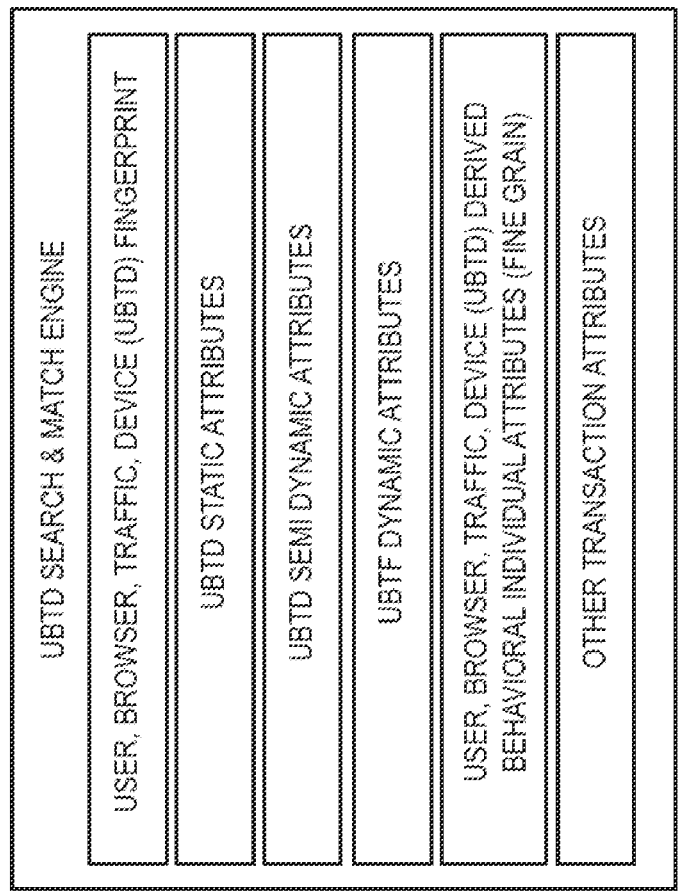
FIG. 8C shows a block diagram of the details of User Browser Traffic Device (UBTD) Search & Match Engine 108j.
Figure 8B:
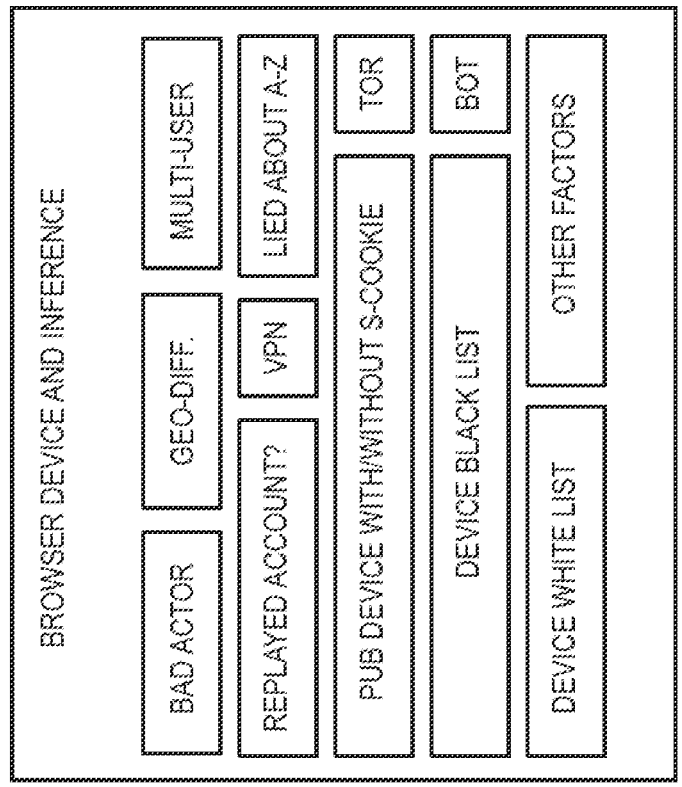
FIG. 8B shows a block diagram of the details of step 800-4, in which a browser and device inference is made in which behavior information, browser and device (104, 106) attributes are collected by the Engine 108.

FIG. 8B shows step 800-5 in more detail. Types of information collected include: whether a bad actor is trying to gain access to a secure facility and/or system; unusual geographic differences of devices 104 and 106; multi-users attempting access to a secure facility and/or system; replayed account; whether it is a virtual private network (VPN); whether lies are detected on a variety of issues from a to z; whether public device is being used with or without the proper cookie; whether it is an anonymous communication (e.g., The Onion Router (TOR) anonymous communication software); whether the device (104, 106) are on a black list or white list; whether bots are detecting performing malicious tasks that allow an attacker to remotely take control over an affected computer; or other factors.

In step 800-6 as shown in FIG. 8C, input is received from User, Behavior, Traffic and Device (UBTD) Search & Match Engine 108j. Engine 108j takes into account UBTD fingerprints, static attributes, semi-dynamic attributes, derived behavioral individual attributes (fine grain), and other transaction attributes in making a determination.

In step 800-7, the access is profiled and a risk score is calculated. Based on the behavioral data, the device 104 and browser 604 fingerprint and use of mobile device (or not) authentication of transactions the risk engine generates risk score. The risk score can be generated locally on a mobile device 104 or, alternatively, by sending all the information to Engine 108. Next, a behavioral confidence score is generated that the user entity 102 of the mobile device 104 (or secure system/client device 106) is in fact the legitimate user, and not someone else. This behavioral confidence score may be paired with a behavioral fingerprint generated for the user 102 of secure system/client device 106. The user entity 102 establishes the fingerprint profile of the device 104. Based on the behavioral data as discussed above, the browser and device finger print and use of mobile device (or not) authentication of transactions a risk engine generates a risk score (either locally on mobile device or by sending all the information to backend server) and a behavioral confidence score is generated that the user of the mobile device, the user entity 102 using the secure system/client device 106 is in fact the legitimate user, and not someone else. This behavioral confidence score may be paired with a behavioral fingerprint generated for the user of secure system/client device 106.

In step 800-8, a test is made to see if the profile and risk score are greater than the predetermined risk threshold. If yes, in step 800-9, it is suspected or known that the device (104 and/or 106) is a bad device and proceeds to UBTD Advanced Tracking (step 800-4) to be added to the list of suspect devices. The UBDT is the central data base tracking all white listed, blacklisted, at risk, suspect devices, browsers, transactions, mobile devices, and habits of the users (good actors vs threat actors) and allows consequent accesses to be searched and matched against historical events associated with a user, device, browser, and the like and fetched data all feeds to Core AIML Risk Engine 108a having artificial intelligence and machine learning for per transaction risk versus friction evaluation.

If no, in step 800-10, the user entity 102 logs in with the measure risk score. In step 800-11, the user entity 102 is authenticated and flow authorized. If the user entity 102 has a mobile application (e.g., mobile eGuardian® app) with various plugins such as biobehavioral, multi-factor authentication, health, and/or Software Development Kits then the system and method 100 deals with the dynamic level of assurance (LOA) and risk score that comes from the mobile device 104 as part of the multi modal with the right confidence score that feeds into the risk threshold calculation on the backend of the Risk and Analytics Engine 108. In cases that the user entity 102 uses a well-known browser (e.g., Chrome®) and there is a legitimate matching with the Internet Protocol (IP) that is tied to a trusted device, location, and/or habit (e.g., user entity 102 home address or work address including a virtual private network (VPN) from legitimate corporation) then all is marked as good from the authentication perspective. However, in cases that the user entity 102 uses tools to stay anonymous such as TOR this user entity 102 is captured and may be designated a nutty user that evidently has the credentials and the out of band (OOB) mobile device 104 and can comply with the dynamic LOA engine 108d. The system and method 100 can apply a higher LOA and for example mandate a push plus biometric authentication when TOR or other anonymous tools are used instead of time base one time password (TOTP) via SMS, voice, email or TOTP apps/services.

If no mobile platform is available to multifactor authenticate (MFA) via a trusted device and whether the user entity 102 fails the authentication before the authorization, the system and method 100 can then enforce other OOB modalities (as outlined in FIG. 9) and methods depending on how much friction should be want to injected into the process.

Note that for every event-trigger the Engine database 108m is updated and scores are tracked and machine learning may be used to draw a graph of normal versus abnormal for the user entity 102 habits, transactions, approvals, and/or declines. This overall backend history is used by an artificial intelligence machine learning process to drive towards perfecting the predictive analytics at individual or at group level of user entities.

Note that a mobile application (e.g., the eGuardian® mobile app) may have a significant number of contextual data from device 104 location, IP address, fourth generation of cellular broadband network technology (4G) data, history, current location and habits via the health application data, walking gait, and bunch of heuristics which are acquired all the time as user entity 102 uses the mobile device 104 throughout the day. In one embodiment when the legitimate users happen to have employed the mobile application then detecting abnormalities and escalating LOA dynamically the ultimate control is in the hands of the legitimate user 102 leveraging the mobile device data and the behavioral derived confidence score is used. For the user entities 102 that they do not have the mobile application, abnormalities can still be detected and force an out of band (OOB) (e.g., email or text/voice) demanding a time based TOTP token. The imposed friction then only taxes threat actors that try to penetrate the Relying Party Server 110 acting as legitimate users with pool of valid usernames and passwords.

Figure 9:
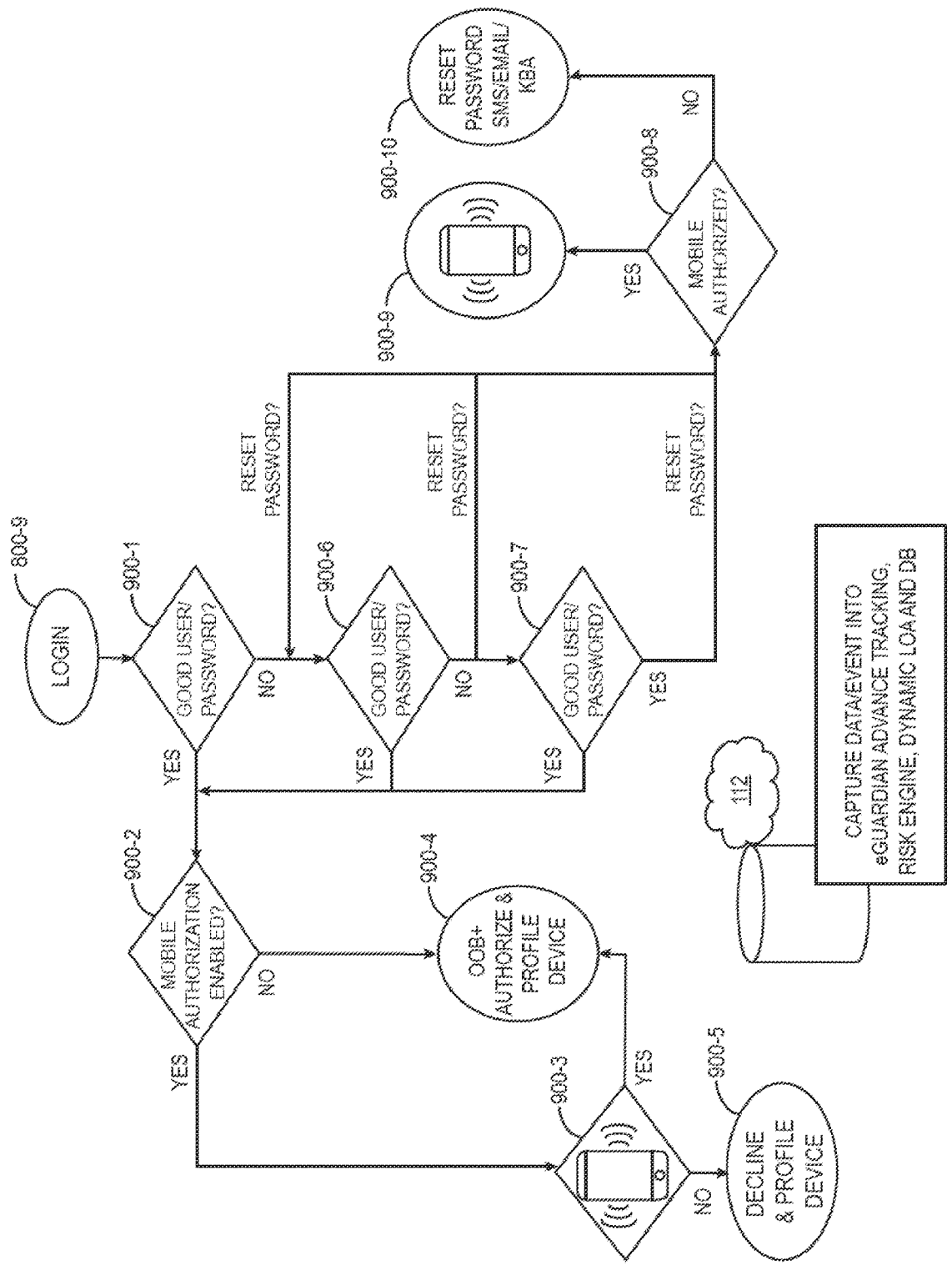
FIG. 9 shows details of the login and authentication flow using mobile "out of band" notification.

In step 800-11, the system 100 proceeds to a decision point whether to add a supercookie (S-Cookie) which is a hard unique ID-token stored on the device, browser or both as the unique identifier of a trusted/issued, registered and authenticated or an approved bring your own device (BYOD). Injecting a supercookie can be used to better classify and serve the legitimate user entities 102 and protect the enterprise from threat actors. If yes, the system 100 proceeds to step 800-9 for login and step 800-10 to authenticate and authorize flow. The user entity 102 may be prompted for a higher level of assurance (LOA) and out of band authentication (as illustrated in FIG. 9 below). If the suspect device 104 gets to login, the system and method 100 can track if they have the user name right and if they have the password right. If not, then the system 100 keeps deducting score. If no, in step 800-12, the system 100 proceeds to an alternative site for forensic analysis and perhaps a customized flow (step 800-13) to determine the identity of the user entity 102 and/or suspect device.

FIG. 9 shows details of the login and authentication flow using mobile "out of band notification". Out of band notification is one form of two-factor authentication that requires a secondary verification method through a separate communication channel along with an identification and password. Returning to login step 800-9, an additional step is added step 900-1 where a good user identification and password is asked. If yes, in step 900-2, mobile authorization is enabled is questioned. If yes, a mobile device is contacted in step 900-3 for authorization. If authorized, in step 900-4 out of band authorization and profile device. If no, in step 900, mobile device declined and profile the device. Returning to step 900-2, if no, then proceeds directly to step 900-4.

Returning to step 900-1, if the user entity 102 does not enter the correct password, the user entity 102 is given several chances to either request a new password or enter a correct password in steps 900-6 and 900-7. In step 900-8, the mobile authorization for the new password is requested. In step 900-9, the out of band authorization is approved by user entity 102. In step 900-10, reset of password by short message service (SMS), email, knowledge based authentication (kba) or the like. The sequence of events, device information and authentication and authorization of all transactions are all stored in the advanced tracking data base in Engine 108 which is a high speed data base used for fast search and match of future transactions from white listed or blacklisted devices, IPs, transactions, locations etc.

Figure 10:
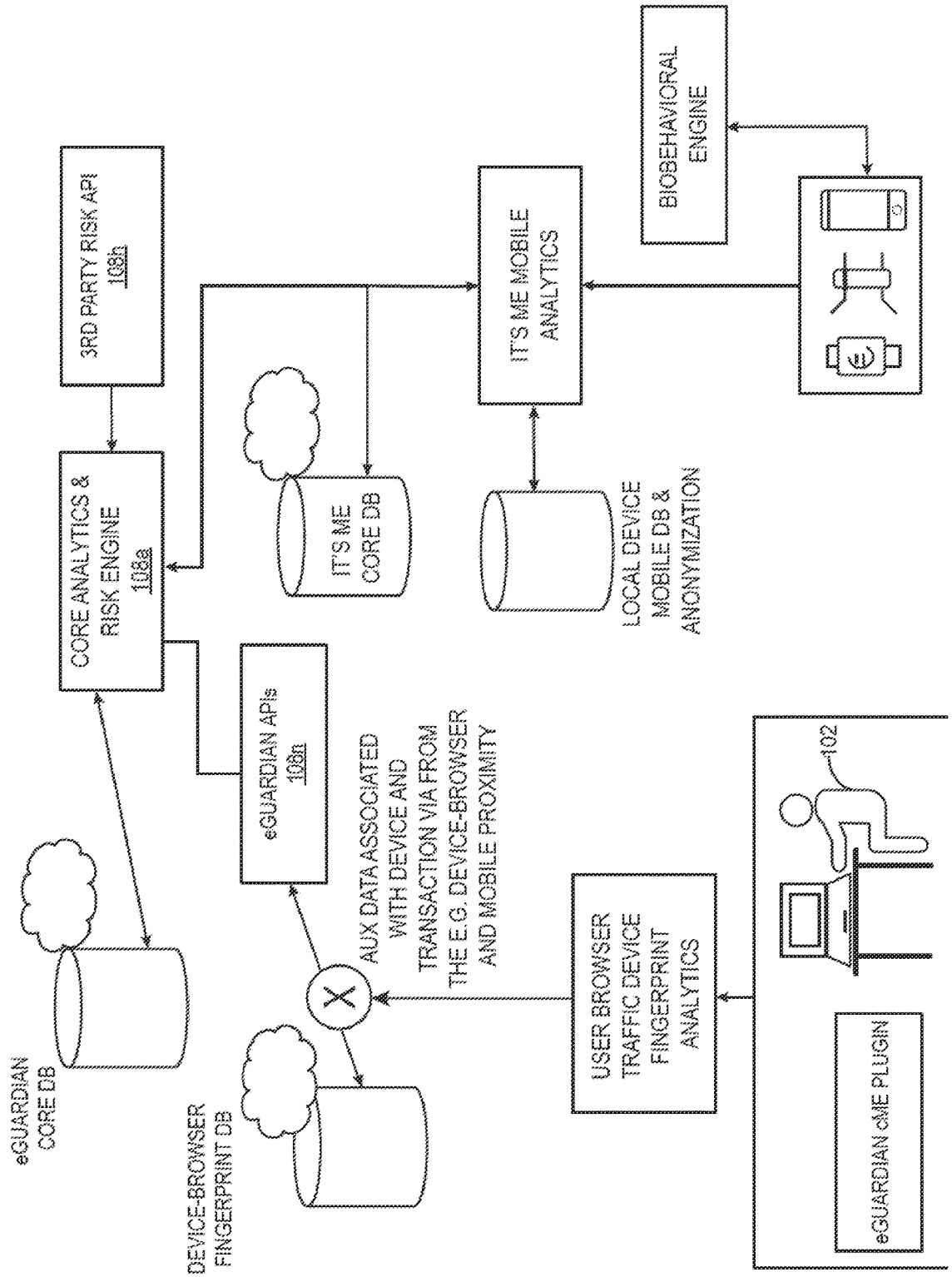
FIG. 10 shows Risk and Analytics Engine 108, browser, user behavior analytics, and mobile/wearable database interface with Core AIML Risk Engine 108a with third party application programming interface (API).

FIG. 10 shows Risk and Analytics Engine 108, browser, user behavior analytics, and mobile/wearable database interface with core analytics and risk engine 108a with third party API interface and the data flow of user, device, browser and the history of transactions and associated status, and inference states of each data set from mobile, browser, device, network and all interacting transactions which are stored in mobile, device and browser fingerprint and the system 108 core DB. The data whether at rest or in transit may be encrypted, anonymized per policy orchestration and configurations of the Relying Party governing privacy and security policies and requirements as well as local or international laws.

Below are samples of ground truth test tables to exemplify different scenarios which can uniquely identify the user entity 102 and their device (or devices) 104 and 106:

| Ground Truth | Description |
|---|---|
| Mobile device 104 and Secure System/Client Device (e.g., desktop) at two different locations on a valid username and password with mobile application (e.g., It'sMe ®) mobile authentication enabled | User entity 102 traveling, spouse logs in from a home desktop (the BFP is healthy and device has been seen for this user entity 102). User Entity 102 has a mobile application (e.g., ItsMen ™), the Relying Party (RP) LOA is LOA 2 + multi-factor authentication (MFA) or below which is passed to the Risk and Analytics Engine 108 (e.g., Guardian ® server) associated with the transaction type. Assume that a mobile application (e.g., It'sMe ™) mobile authentication is set to "auto-accept" policy as the account of interest does not require multi factor authentication (MFA) but just an audit trail to keep user entity aware of transactions on their behalf has been determined to be sufficient. However, the Risk and Analytics Engine 108 (e.g., eGuardian ®'s risk engine) detects some abnormality, of the "type = Geo-Diff" meaning an abnormality associated with the location differential of the web client versus the mobile device locations which will ignore the "auto-accept" policy and force a mobile authentication out of band |
| User entity 102 does not have mobile application (e.g., ItsMen ™) mobile authentication enabled, the device and browser fingerprint looks is good (not a blacklisted device, exceeds trust threshold when profiled, . . .), the device 104 was not used to enroll originally to the account nor has ever visited the service portal, The Username + Password is a valid but an out of band is required to promote the access to authorized state and mark the device 104 as a verified device | The secure system/client device 106 is fingerprinted but classified as "new machine" hence an out of band (OOB) verification is needed to authenticate the user as the legitimate owner of account. In this case given the device-browser fingerprint was classified as "good-device" as the device and browser and network meet the required criteria of "good-device". A "needs-OOB-Verify-To-register-whitelist the new machine type=1" flag is set, which needs to be cleared by some registered-approved out of band authentication method such as SMS, email, and/or voice call verification. The clearing of the OOB-verify bit allows the finger printed device to be tracked as a trusted device and be added to the white listed devices associated with this user name and device. Post OOB verification the user entity 102 logs in with username and password and since the device and browser is finger printed and the finger print still good and the device 106 is whitelisted the login attempt proceeds and access is authorized |
| User entity 104 has the mobile application (e.g., ItsMen ™) mobile authentication/MFA enabled, access portal has Risk and Analytics Engine 108 (e.g., system eGuardian ®) plugin, a valid username + password is presented to access portal services-data. If the device and browser fingerprint is not good (does not meet risk score threshold) the login is blocked until authentication via mobile application (e.g., It'sMe ™) (including various method of OOB supported by the mobile application (e.g., It'sMe ™) (push, biometric, pin, third party or standard authentication supported) out of band (OOB) is provided | The machine is fingerprinted but the "new machine" needs an OOB with some method of mobile application authentication (e.g., It'sMe ™) including biometric (voice, fingerprint, face). Can be proprietary or standard (e.g., Fast ID Online (FIDO) cryptography, Department of Defense Self-Service (DS) Logon). If device, network, and/or habits of user entity 102 on login device or mobile device 104 and the browser finger print are not meeting success criteria set then mobile application (e.g., ItsMe ™) MFA is enabled and the mobile application on the registered-bonded device 104 with biometric capabilities gets the level of assurance set to level desired and criteria needs to be met to allow the access |
| Account take over 2 login post enrollment | Same Device-bad fingerprint (even the stable part to be the same is enough to detect same device) good vs. bad fingerprint initializing multiple logins where the account log ins are not from a kiosk device then they system 100 knows possible account take over. In this case OOB authentication and since fingerprint is bad do not promote device to whitelist for false positives. Send warning to Relying Party administration (should the crop email account be always kept as secondary email account when a personal email is introduced) |
| MFA enabled, but mobile application not installed or logged off, bad fingerprint is good and device 104 is same as enrollment device. | User entity 102 has registered for mobile application (e.g., ItsMen ™) MFA, has a confirmed email and phone for SMS, or voice. A verified email on the record. Given the MFA is enabled for the site, and the automatic acceptance was not set, user device 104 mobile application not connected to backend servers and undetected by Risk and Analytics Engine 108 (e.g., eGuardian). Then the use gets a two ways SMS approve either AD? has verified that Username + Password is |

| Ground Truth | Description |
| --- | --- |
| | good, and given that the bad fingerprint is healthy and the browser machine is same as enrolled machine and in the system. Note that the geographic location differential of mobile device 104 and web cannot be detected. |
| User does not have mobile application (e.g., ItsMe ™) enabled (and hence no mobile application either), Username + Password is good, User does not have mobile device for SMS, can get a voice call, the bad fingerprint is bad | In this case given the device-browser fingerprint was bad the system 100 sets a "needs-OOB-Verify-Bad Fingerprint" which needs to be cleared by an email or voice one time password (OTP) that is entered in the browser form. The clearing of the bit allows the device that just got fingerprinted as bad fingerprint to login. Now the user entity logs in with username and password and since fingerprint is still bad the device is not white listed for the user entity. |
| Account take over | Same device-bad fingerprint (even the stable/static part to be same is enough to detect it is same device) initiating multiple enrollments where the account enrollments are not from a kiosk device then Risk and Analytics Engine 108 (e.g., eGuardian ®) know possible account take over. In this case prevent enrollment unless a legitimate set of parameters checked off (e.g., supercookie, perfect white listed browser fingerprint, stable IP. . .). |
| User Behavioral | Data graph (access, sharing, file download size, type of access, applications used, etc.) violation from normal behavior of user and their devices or actual physical behavior like user location, user walking gait, habits,. . . are detected as an abnormality results in the Risk and Analytics Engine 108 (e.g., eGuardian ®) know possible account take over and hence demands for Dynamic LOA and additional authentication and verification. |
| Spatiotemporal velocity inference | User device mobile vs desktop/laptop spatiotemporal score does not meet location, proximity and time equations based on predictive analytics (mobile device in NYC, transaction initiated in London, device may or may not have the white listed IP but due to spatiotemporal velocity abnormality results in the Risk and Analytics Engine 108 (e.g., eGuardian ®) know possible account take over and hence demands for Dynamic LOA and additional authentication and verification. |

The foregoing has outlined rather broadly features and technical advantages of examples in order that the detailed description that follows can be better understood. The foregoing embodiments are presently by way of example only; the scope of the present disclosure is to be limited only by the claims. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Each of the figures is provided for the purpose of illustration and description only and not as a definition of the limits of the claims. No language in the specification should be construed as indicating any non-claimed element as essential to the practice of the invention Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Specific details are given in the description to provide a thorough understanding of the embodiments. However, embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the disclosure. Rather, the preceding description of the embodiments will provide those skilled in the art with an enabling description for implementing embodiments of the disclosure. Various changes may be made in the function and arrangement of elements without departing from the spirit and scope of the disclosure.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Moreover, the illustration of a process by its depiction in a drawing does not imply that the illustrated process is exclusive of other variations and modifications thereto, does not necessarily imply that the illustrated process or any of its steps are necessary to the embodiment(s), and does not imply that the illustrated process is preferred.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The definitions of the words or elements of the claims shall include not only the combination of elements which are literally set forth, but all equivalent structure, material or acts for performing substantially the same function in substantially the same way to obtain substantially the same result.

Neither the Title (set forth at the beginning of the first page of the present application) nor the Abstract (set forth at the end of the present application) is to be taken as limiting in any way as the scope of the disclosed invention(s). The title of the present application and headings of sections provided in the present application are for convenience only, and are not to be taken as limiting the disclosure in any way.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

It should be noted that the recitation of ranges of values in this disclosure are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9).

The invention claimed is:

1. A system for using user entity context and behavior information for providing and restricting access to a secure computer network comprising:
a plurality of hardware processors coupled to a network interface, the hardware processors configured to:
capture behavioral and contextual factors of a user entity interacting with a client device used to access cloud services, wherein the behavioral and contextual factors include the user entity behavior and habits, client device characteristics, client device browser characteristics and network traffic when transacting and not transacting with the secure computer network;
calculate a transaction risk and confidence score of a user entity, the client device and the client device browser for a transaction request based on the user entity behavior and habits and client device characteristics obtained from the user entity when transacting and not transacting with the secure computer network; and
compare the transaction risk and confidence score to a predetermined threshold required risk score to determine whether the transaction request is automatically approved and when not approved, send an out of band authentication request to a user entity device to authenticate and authorize access.

2. The system of claim 1, wherein the behavioral and contextual factors required to determine the transaction risk and confidence score are limited to the user entity behavior and habits and client device characteristics and wherein the number of behavioral and contextual factors used to determine the transaction risk and confidence score are increased depending on the level of risk associated with deviation of the user entity and client device normal behavior.

3. The system of claim 1, wherein the behavioral and contextual factors of the user entity interacting with the client device include at least one from the group consisting of: unique attribute data collection and fingerprinting of the network; unique attribute data collection and fingerprinting of the client device; and unique attribute data collection and fingerprinting of the client device browser.

4. The system of claim 1, wherein the plurality of processors are further configured to:
measure the transaction risk through a search and match against a set of static and dynamic attributes using the behavioral and contextual factors of the user entity, the client device characteristics, and the client device browser characteristics; and
match the attributes of past approved transactions.

5. The system of claim 1, wherein the out-of-band authentication request is performed using at least one from a group consisting of:
email, short message service (sms), voice, push, voice call, secure key, biometric authentication, and nearfield communications with the user entity device.

6. The system of claim 1, wherein the contextual data of the user entity device contributes to the calculation of the transaction risk and confidence score.

7. The system of claim 1, wherein the behavioral and contextual factors further include at least one of the group of egocentric and allocentric factors consisting of:
the user entity device model, the user entity device hardware configuration, the user entity device operating system, the user entity device applications, the user entity device web browser version, information of the client device.

8. A method for using user entity context and behavior information for providing and restricting access to a secure computer network comprising:
capturing behavioral and contextual factors of a user entity interacting with a client device used to access cloud services, wherein the behavioral and contextual factors include the user entity behavior and habits, client device characteristics, client device browser characteristics and network traffic when transacting and not transacting with the secure computer network;
calculating a transaction risk and confidence score of a user entity, the client device and the client device browser for a transaction request based on the user entity behavior and habits and client device characteristics obtained from the user entity when transacting and not transacting with the secure computer network; and
comparing the transaction risk and confidence score to a predetermined threshold required risk score to determine whether the transaction request is automatically approved and when not approved, send an out of band authentication request to a user entity device to authenticate and authorize access.

9. The method of claim 8, wherein the behavioral and contextual factors required to determine the transaction risk and confidence score are limited to the user entity behavior and habits and client device characteristics and wherein the number of behavioral and contextual factors used to determine the transaction risk and confidence score are increased depending on the level of risk associated with deviation of the user entity and client device normal behavior.

10. The method of claim 8, wherein the behavioral and contextual factors of the user entity interacting with the client device include at least one from the group consisting of: unique attribute data collection and fingerprinting of the network;
unique attribute data collection and fingerprinting of the client device; and unique attribute data collection and fingerprinting of the client device browser.

11. The method of claim 8, further comprising:
measuring the transaction risk through a search and match against a set of static and dynamic attributes using the behavioral and contextual factors of the user entity, the client device characteristics, and the client device browser characteristics; and
matching the attributes past approved transactions.

12. The method of claim 8, wherein the out-of-band authentication request is performed using at least one from a group consisting of:
email, short message service (sms), voice, push, voice call, secure key, and biometric authentication, and nearfield communications with the user entity device.

13. The method of claim 8, wherein the contextual data of a user entity device contributes to the calculation of the transaction risk and confidence score.

14. The method of claim 8, wherein the behavioral and contextual factors further include at least one of the group of egocentric and allocentric factors consisting of:
the user entity device model, the user entity device hardware configuration, the user entity device operating system, the user entity device applications, the user entity device web browser version, information of the client device.

15. The system of claim 1 wherein the user entity device includes hardware sensors embedded inside the user entity device to measure haptic-taptic factors; and
wherein the behavioral and contextual factors include the haptic-taptic factors.

16. The system of claim 1 wherein the user entity device includes a plurality of sensors to capture ambient noise, movements and location of the user entity device; and
wherein the behavioral and contextual factors include the ambient noise, movements and location of the user entity device.

17. The method of claim 8 wherein the user entity device includes hardware sensors embedded inside the user entity device to measure haptic-taptic factors; and
wherein the behavioral and contextual factors include the haptic-taptic factors.

18. The method of claim 8 wherein the user entity device includes a plurality of sensors to capture ambient noise, movements and location of the user entity device; and
wherein the behavioral and contextual factors include the ambient noise, movements and location of the user entity device.

* * * * *